United States Patent
Osumi et al.

(10) Patent No.: US 6,506,239 B1
(45) Date of Patent: Jan. 14, 2003

(54) LIQUID COMPOSITION, INK SET, RECORDING PROCESS, INK CARTRIDGE, RECORDING UNIT, PROCESS FOR FORMING MULTI-COLOR IMAGE, INK-JET APPARATUS, PROCESS FOR FACILITATING FIXING OF INK TO RECORDING MEDIUM, AND PROCESS FOR IMPROVING QUALITY OF MULTI-COLOR IMAGE

(75) Inventors: Koichi Osumi, Kawasaki (JP); Shinya Mishina, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 09/662,030

(22) Filed: Sep. 14, 2000

(30) Foreign Application Priority Data

Sep. 16, 1999 (JP) .............................. 11-261971

(51) Int. Cl.$^7$ .............................................. C09D 11/02
(52) U.S. Cl. ................. 106/31.27; 106/31.58; 106/31.6; 106/31.86
(58) Field of Search .................... 106/31.27, 31.58, 106/31.6, 31.86

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,608,577 A | 8/1986 | Hori | 346/140 |
| 5,218,376 A | 6/1993 | Asai | 346/1.1 |
| 5,549,740 A * | 8/1996 | Takahashi et al. | 106/31.43 |
| 5,609,671 A | 3/1997 | Nagasawa | 106/20 |
| 5,734,403 A | 3/1998 | Suga et al. | 347/101 |
| 5,837,045 A | 11/1998 | Johnson et al. | 106/31.85 |
| 6,004,389 A * | 12/1999 | Yatake | 106/31.28 |
| 6,059,868 A * | 5/2000 | Kasperchik | 106/31.27 |
| 6,299,675 B1 * | 10/2001 | Ono et al. | 106/31.27 |

FOREIGN PATENT DOCUMENTS

| | | | |
|---|---|---|---|
| EP | 892024 A1 * | 1/1999 | C09D/11/00 |
| EP | 1041126 A2 * | 10/2000 | B41J/02/01 |
| JP | 54-56847 | 5/1979 | |
| JP | 59-123670 | 7/1984 | |
| JP | 60-71260 | 4/1985 | |
| JP | 64-6074 | 1/1989 | |
| JP | 8-3498 | 1/1996 | |
| JP | 9-40898 | 2/1997 | |
| JP | 02-783647 | 5/1998 | |
| JP | 11105415 A * | 4/1999 | B41M/05/00 |

OTHER PUBLICATIONS

Derwent abstract of JP 11/105415, 4/99.*

* cited by examiner

Primary Examiner—Helene Klemanski
(74) Attorney, Agent, or Firm—Fitzpatrick, Cella, Harper & Scinto

(57) ABSTRACT

An ink set capable of reducing the influence of recording media on image quality and stably forming high-quality images is provided. The ink set includes a liquid composition containing at least one salt selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$, wherein M1 denotes an alkali metal, ammonium or organic ammonium, and Ph denotes a phenyl group, and at least one ink selected from the group consisting of yellow, magenta, cyan, black, red, blue and green inks.

25 Claims, 18 Drawing Sheets

LIQUID COMPOSITION, INK SET, RECORDING PROCESS, INK CARTRIDGE, RECORDING UNIT, PROCESS FOR FORMING MULTI-COLOR IMAGE, INK-JET APPARATUS, PROCESS FOR FACILITATING FIXING OF INK TO RECORDING MEDIUM, AND PROCESS FOR IMPROVING QUALITY OF MULTI-COLOR IMAGE

BACKGROUND OF THE INVENTION

1. Field of the Invention

The present invention relates to a liquid composition, an ink set, a recording process, an ink cartridge, a recording unit, a process for forming a multi-color image, an ink-jet apparatus, a process for facilitating fixing of inks to a recording medium, and a process for improving the quality of a multi-color image.

2. Related Background Art

Inks using carbon black, which is a black colorant capable of providing prints high in optical density and excellent in fastness properties and the like, have heretofore been proposed as a black ink for writing utensils (fountain pens, felt-tip pens, aqueous ball-point pens, etc.) and black ink for an ink-jet apparatus.

In particular, in recent years, detailed research and development have been conducted of various aspects such as the composition and physical properties of ink so that a good print can be made even on plain paper, such as paper for copying, paper for reporting, notepaper, letter paper, bond paper and continues slip paper, which are commonly used in offices. For example, Japanese Patent Application Laid-Open Nos. 61-283875 and 64-6074 disclose water-based pigment inks comprising carbon black and a dispersing agent. Japanese Patent Application Laid-Open No. 8-3498 points out such a technical problem that when an ink containing carbon black together with a dispersing agent is used as an ink for an ink-jet printer, ejection becomes unstable or a sufficient image density is not achieved, and discloses a water-based pigment ink using self-dispersing carbon black, but using no dispersing agent as an ink capable of solving such a problem.

Dyes are used as coloring materials in color inks. Dyes are superior in coloring ability and stability, but are required to be improved in water resistance and light resistance. In recent years, a great number of water-based inks using an organic pigment in place of a dye have been proposed for solving these problems. For example, Japanese Patent Application Laid-Open No. 9-40898 discloses an idea that a high-hydrophilic, low-molecular compound is adsorbed on the surface of an organic pigment, and shelf stability and the quality of printed images are made to be compatible with each other. In addition, a dispersion of an organic pigment is disclosed in U.S. Pat. No. 5,837,045, etc, where the organic pigment has functional groups bonded directly to its surface, like carbon black, many types of which have been proposed, capable of being stably dispersed or dissolved in water without using any dispersing agent. The present inventors have carried out various investigations as to the case where inks containing a coloring material, such as carbon black and/or an organic pigment, were used in ink-jet recording. As a result, it has been found that when the compositions of the inks are adjusted in order for the inks not to penetrate into a recording medium as much as possible for the purpose of improving image density and coloring ability, the inks remain on the recording medium without penetrating into the recording medium, and so bleeding (hereinafter singly referred to as "bleed") between different colors occurs at their boundaries as a new problem caused by lowering the penetrability.

In order to prevent the occurrence of bleed, for example, Japanese Patent Application Laid-Open No. 6-228478 discloses a technique in which an ink set comprising a colorless liquid composition and an ink is used, and the two react with each other through ionic reaction when mixed with each other so that the viscosity of the ink is increased or a coloring material in the ink is coagulated or deposited so as to facilitate the separation (solid-liquid separation) of solids (the coloring material and the like) from a liquid in the ink on a recording medium.

The occurrence of bleed can be extremely effectively prevented by using the above-described technique. However, since the technique utilizes an ionic reaction, the above ink and liquid composition quickly react with each other when they are mixed. Accordingly, when such a combination is used as, for example, an ink set for ink-jet recording, recovery systems for the ink and liquid composition in an ink-jet head must be completely separated. More specifically, when the recovery systems for the ink and liquid composition are made common, the ink and the liquid composition react with each other in such a recovery system to solidify the components in the ink. As a result, the function of the recovery system in the ink-jet head may be gradually deteriorated. On the other hand, the provision of a plurality of recovery systems in an ink-jet apparatus may inhibit the apparatus from being miniaturized or cause an increase in product cost in some cases.

SUMMARY OF THE INVENTION

The present invention has been made in view of the foregoing circumstances and one of its objects is to provide a liquid composition which can realize high-quality images at a low cost.

Another object of the present invention is to provide an ink set which enables high-a-quality images to be formed.

Still another object of the present invention is to provide a recording process which enables high-quality images to be formed.

A further object of the present invention is to provide a process for forming a high-quality, multi-color image, which can prevent bleed from occurring.

A still further object of the present invention is to provide a recording unit and an ink cartridge which can be used in the formation of high-quality images.

Yet another object of the present invention is to provide an ink-jet recording apparatus which enables high-quality images to be formed.

Yet still another object of the present invention is to provide a process for facilitating the fixing of an ink to a recording medium to form a high-quality image.

A yet still further object of the present invention is to provide a process for improving the quality of a multi-color image by preventing the occurrence of bleed.

The above objects can be achieved by the present invention described below.

According to an embodiment of the present intention, there is provided a liquid composition used for forming an ink-jet image together with an ink containing a coloring material dispersed in an aqueous medium by the action of an ionic group, which contains at least one salt selected from the group consisting of $(M1)_2SO_4$, $CH_3COO(M1)$, Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group.

According to an embodiment of the present invention, there is also provided an Ink set comprising, in combination, an ink comprising an aqueous medium and a coloring material dispersed in the aqueous medium by the action of an ionic group, and the liquid composition described above.

According to an embodiment of the present invention, there is further provided a recording process comprising the steps of:

(i) applying an ink comprising an aqueous medium and a coloring material dispersed in the aqueous medium by the action of an ionic group to a recording medium; and (ii) applying a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, to at least a region on the recording medium, to which the ink is applied.

According to an embodiment of the present invention, there is still further provided a process for forming on a recording medium a multi-color image including regions which are different in hue from each other and have a portion at which they are adjacent to each other, the process comprising the steps of:

applying a plurality of inks different in hue from each other to the recording medium to form the multi-color image, wherein at least one of the inks is a coloring material-dispersed ink containing an aqueous medium and a coloring material dispersed in the aqueous medium by the action of an ionic group; and applying a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, to at least a region on the recording medium, to which the coloring material-dispersed ink is applied.

According to an embodiment of the present invention, there is yet further provided a recording unit comprising a liquid composition holding portion holding a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, and an ink-jet head from which the liquid composition is ejected.

According to an embodiment of the present invention, there is yet still further provided a recording unit comprising a liquid composition holding portion for holding a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, an ink-jet head from which the liquid composition is ejected, an ink container portion holding an ink containing an aqueous medium and a coloring material dispersed in the aqueous medium by the action of an ionic group, and an ink-jet head from which the ink is ejected.

According to an embodiment of the present invention, there is yet still further provided an ink cartridge which holds a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_2$ and (M1)$_2$CO$_3$, wherein M1 denotes an alkali metal, ammonium or organic ammonium, and Ph denotes a phenyl group, and is detachably installed in an ink-jet head from which the liquid composition is ejected.

According to an embodiment of the present invention, there is yet still further provided an ink-jet apparatus comprising a liquid composition holding portion holding a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, an ink container portion holding an ink comprising an aqueous medium and a coloring material dispersed in the aqueous medium by the action of an ionic group, and ink-jet heads from which the liquid composition held in the liquid composition holding portion and the ink held in the ink container portion are ejected independently of each other.

According to another embodiment of the present invention, there is yet still further provided an ink-jet apparatus comprising a first recording unit which comprises a liquid composition holding portion holding a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, and an ink-jet head from which the liquid composition is ejected, and a second recording unit which comprises an ink container portion holding an ink comprising an aqueous medium and a coloring material dispersed in the aqueous medium by the action of an ionic group, and an ink-jet head from which the ink is ejected.

According to an embodiment of the present invention, there is yet still further provided a process for facilitating the fixing of an ink containing an aqueous medium and a coloring material dispersed in the aqueous medium by the action of an ionic group to a recording medium when the ink is applied to the recording medium by using an ink-jet apparatus, the process comprising applying a liquid composition containing at least one salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$, wherein M1 denotes an alkali metal, ammonium or organic ammonium, and Ph denotes a phenyl group, to at least an area on the recording medium, where the ink is applied.

According to an embodiment of the present invention, there is yet still further provided a process for improving the quality of a multi-color image on a recording medium, the multi-color image containing at least a first region and a second region which are different in color from each other and adjacent to each other at least at a part thereof, the process comprising the steps of:

forming the first region by a process comprising a step of applying a first ink having a first hue to the recording medium and a step of applying a liquid composition to at least an area on the recording medium, where the first ink is applied; and forming the second region by a process comprising a step of applying a second ink having a second hue to the recording medium, wherein the first ink is an ink containing an aqueous medium and a coloring material dispersed in the aqueous medium by the action of an ionic group, and the liquid composition contains at least one salt selected from the group consisting of $(M1)_2SO_4$, $CH_3COO(M1)$, $Ph\text{—}COO(M1)$, $(M1)NO_3$, $(M1)Cl$, $(M1)Br$, $(M1)I$, $(M1)_2SO_3$ and $(M1)_2CO_3$, wherein M1 denotes an alkali metal, ammonium or organic ammonium, and Ph denotes a phenyl group.

According to the above embodiments of the present invention, for example, image quality can be improved. More specifically, even when printing is conducted on paper having high permeability, with which, for example, character sharpness may be impaired, or image density and coloring ability may be deteriorated, high quality images can be formed, and moreover the fixing ability to the paper can also be improved.

According to the above embodiments of the present invention, the occurrence of bleed can be extremely effectively alleviated in addition to the effects described above, and so high-quality, multi-color images can be provided.

The reason why the above effects are brought about by such embodiments is not clearly known, but is guessed to be as follows.

Namely, when the liquid composition is applied to a recording medium, a solvent in the liquid composition penetrates into the recording medium or vaporizes into the air, and so the concentration of the salt in the liquid composition on the surface of the recording medium quickly increases. When the liquid composition that causes such a phenomenon and an ink in which a coloring material such as a pigment is stably dispersed by the action of an ionic group, for example, an anionic group, are applied to the recording medium in such a manner that they are brought into contact with each other on the surface of the recording medium, the dispersion stability of the coloring material in the ink is broken by the increase in the concentration of the salt in the liquid composition on the surface of the recording medium, and so the coloring material comes to aggregate or deposit. In other words, the separation of the coloring material making up the ink and the aqueous medium are facilitated. As a result, the penetration of the coloring material into the recording medium can be prevented and images excellent in sharpness of contour and the like can be formed. In addition, it is considered that since the ink quickly undergoes solid-liquid separation, it is difficult for such a phenomenon as described above to occur even when printing is conducted on paper having high permeability. In other words, it is considered that factors depending on the kinds of paper, such as the degree of permeability, come to hardly matter. Further, the liquid composition and ink according to the present invention do not immediately react with each other when mixed as described above. Therefore, they have such an advantage that even when they are used as, for example, an ink set for ink-jet recording, a common recovery system of an ink-jet head can be used.

BRIEF DESCRIPTION OF THE DRAWINGS

FIG. 31 is a schematic perspective view of an ink-jet recording apparatus which is an example of a liquid-ejecting apparatus the liquid-ejecting head according to the present invention can be installed in, and applied to.

Figure 1:
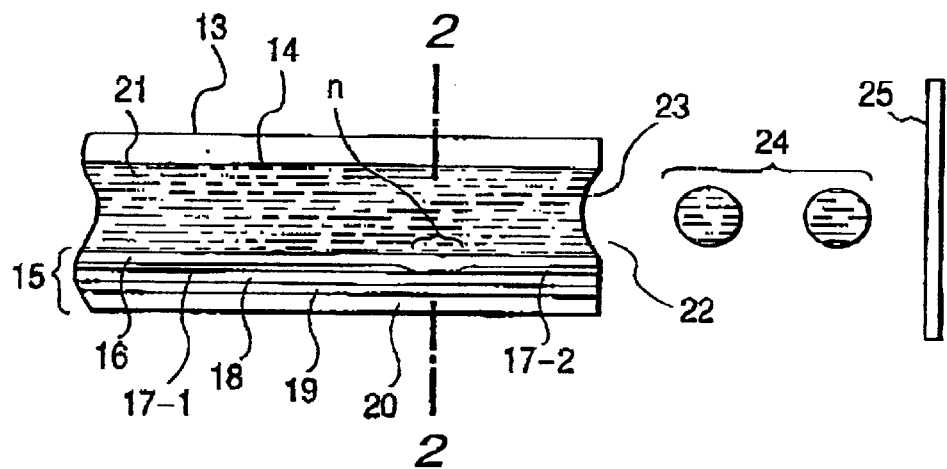
FIG. 1 is a longitudinal cross-sectional view illustrating an exemplary head of an ink-jet recording apparatus.

DESCRIPTION OF THE PREFERRED EMBODIMENTS (Liquid Composition)

A liquid composition which can break the dispersion stability of a coloring material in the ink dispersed in an aqueous medium by the action of an ionic group on the recording medium preferably comprises a salt and an aqueous medium.

(Salt)

Examples of the salt preferably used herein include $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal, ammonium or organic ammonium, and Ph denotes a phenyl group. Specific examples of the alkali metal include Li, Na, K, Rb and Cs. Specific examples of the organic ammonium include methylammonium, dimethyl-ammonium, trimethylammonium, ethylammonium, diethyl-ammonium, triethylammonium, methanolammonium, dimethanolammonium, trimethanolammonium, ethanolammonium, diethanolammonium and triethanolammonium. The content of the salt in the liquid composition may preferably range from 1 to 20 weight % based on the total weight of the liquid composition in view of the various benefits according to the present invention. Furthermore, the liquid composition may have light absorption in the visible area, i.e. the liquid composition may not be transparent.

(Aqueous Medium)

Examples of the aqueous medium used in the liquid composition according to this embodiment include water and mixed solvents of water and a water-soluble organic solvent. As the water-soluble organic solvent, particularly preferred is a solvent having an effect of preventing the drying of the liquid composition. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol; amides such as dimethylformamide and dimethylacetamide; ketones and ketone alcohols such as acetone and diacetone alcohol, ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. The water-soluble organic solvents mentioned above may be used either singly or in any combination thereof.

With respect to the water, it is desirable to use deionized water.

No particular limitation is imposed on the content of the water-soluble organic solvent contained in the liquid composition according to the present invention. However, it is preferably within a range of from 3 to 50% by weight based on the total weight of the liquid composition. On the other hand, the content of water contained in the liquid composition is preferably within a range of from 50 to 95% by weight based on the total weight of the liquid composition.

In order to provide a liquid composition having desired physical properties, a surfactant, an antifoaming agent, an antiseptic, a mildewproofing agent and the like may be added to the liquid composition in addition to the above-described components, as needed. Further, a commercially available coloring material, such as a water-soluble dye, may also be added.

(Ink)

The above-described liquid composition has preferable effects, such as the formation of high quality images, by using it in recording in combination with an ink in which a coloring material is dispersed in an aqueous medium by the action of an ionic group.

Examples of the coloring material used in such an ink include pigments, microcapsulated pigments and colored resins. These coloring materials will hereinafter be described in detail.

(Pigment)

Examples of usable pigments include carbon black and organic pigments.

(Carbon Black)

Examples of the carbon black include carbon black pigments such as furnace black, lamp black, acetylene black and channel black. Specific examples of such carbon black pigments used include Raven 7000, Raven 5750, Raven 5250, Raven 5000, Raven 3500, Raven 2000, Raven 1500, Raven 1250, Raven 1200, Raven 1190 ULTRA-11, Raven 1170 and Raven 1255 (products of Columbian Carbon Japan Limited); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (products of CABOT Co.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (products of Degussa AG); and No. 25, No. 33, No. 40, No. 47, No. 52, No. 900, No. 2300, MCF-88, MA600, MA7, MA8 and MA100 (products of Mitsubishi Kagaku Co., Ltd.). The carbon black pigments are not limited thereto, and any conventionally-known carbon black may be used. Fine particles of magnetic materials such as magnetite and ferrite, titanium black, etc. may also be used as black pigments.

(Organic Pigment)

Specific examples of the organic pigments include insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthorone and thioindigo maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Fyranthrone Orange; thioindigo pigments; condensed azo pigments; Flabanthrone Yellow, Acylamide Yellow, Quinophthalone Yellow; Nickel Azo Yellow, Copper Azomethine Yellow, Perylone Orange, Anthrone Orange, ianthraquinonyl Red and Dioxazine Violet.

Examples of the organic pigments in terms of color index (C.I.) number include C.I. Pigment Yellow 12, 13, 14, 17, 20, 24, 74, 83, 86, 93, 109, 110, 117, 120, 125, 137, 138, 147, 148, 151, 153, 154, 166 and 168; C.I. Pigment Orange 16, 36, 43, 51, 55, 59 and 61; C.I. Pigment Red 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet 19, 23, 29, 30, 37, 40 and 50; C.I. Pigment Blue 15, 15:1, 15:4, 15:6, 20, 60 and 64; C.I. Pigment Green 7 and 36; and C.I. Pigment Brown 23, 25 and 26. It goes without saying that besides the above, conventionally known organic pigments may also be used.

(Dispersing Agent)

When the above-describe carbon black or organic pigment is used, a dispersing agent is preferably used in combination therewith. As the dispersing agent, preferably used is a dispersing agent that the above-described pigment can be stably dispersed in an aqueous medium by the action of an anionic group. Specific examples of the dispersing agent include styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic half ester copolymers, vinylnaphthalene-acrylic acid copolymers, vinylnaphthalene-maleic acid copolymers, styrene maleic anhydride-maleic half ester terpolymers and salt thereof. These dispersing agents preferably have a weight average molecular weight ranging from 1,000 to 30,000, particularly preferably from 3,000 to 15,000.

(Self-dispersing Pigment)

As the coloring material, a pigment may also be used (the so-called self-dispersing pigment) that is capable of being dispersed in an aqueous medium without using any dispersing agent, in which an ionic group (anionic group) has been bonded to the surface of the pigment. As an example of such a pigment, self-dispersing carbon black may be used.

As an example of the self-dispersing carbon black, carbon black to the surface of which an anionic group has been bonded may be used.

As examples of the anionic carbon black, there may be identified those in which at least one anionic group selected from the group consisting of —COO(M2), —SO$_3$(M2), —PO$_3$H(M2) and —PO$_3$(M2)$_2$ has been bonded to the surface of carbon black.

In the above formulae, M2 is hydrogen, alkali metal, ammonium or organic ammonium. Of these, anionically charged carbon black by bonding —COO(M2) or —SO$_3$(M2) to the surface of carbon black is particularly preferably used in this embodiment because such carbon black has good dispersibility in inks. With respect to "M2" in the above-described hydrophilic groups, specific examples of the alkali metal include Li, Na, K, Rb and Cs, and specific examples of the organic ammonium include methylammonium, dimethylammonium, trimethylammonium, ethylammonium, diethylammonium, triethylammonium, methanolammonium, dimethanolammonium and trimethanolammonium. The inks according to this embodiment containing self-dispersing carbon black, in which M2 is ammonium or organic ammonium, may be particularly preferably used in that the water resistance of the resulting printed images can be further improved. The reason for it is considered to be attributable to decomposition of the ammonium and the vaporization of ammonia when the ink is applied onto a recording medium. The self-dispersing carbon black, in which M2 is ammonium, can be prepared in accordance with, for example, a process in which self-dispersing carbon black, in which M2 is an alkali metal, is subjected to ion-exchange to substitute ammonium for the alkali metal, or a process in which an acid is added to the self-dispersing carbon black to change it into the H type, and ammonium hydroxide is then added to substitute ammonium for H (M2).

As a method for preparing the anionically charged self-dispersing carbon black, there may be identified, for example, a process in which carbon black is subjected to an oxidation treatment with sodium hypochlorite. By this process, a —COONa group can be chemically bonded to the surface of carbon black.

The various hydrophilic groups as described above may be directly bonded to the surface of carbon black. Alternatively, they may be indirectly bonded to the surface of carbon black by intervening another atomic group between the surface of carbon black and such a hydrophilic group. Specific examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of the atomic group and the hydrophilic group include —C$_2$H$_4$COO(M2), —Ph—SO$_3$(M2) and —Ph—COO(M2), wherein Ph is a phenylene group.

In the present invention, two or more kinds of self-dispersing carbon black may be suitably selected from among the above-described self-dispersing carbon black and used as a coloring material for ink. The amount of the self-dispersing carbon black added into the ink is preferably within a range of from 0.1 to 15% by weight, and particularly preferably from 1 to 10% by weight based on the total weight of the ink. By controlling the amount of the self-dispersing carbon black within this range, the self-dispersing carbon black can maintain a satisfactorily dispersed state in the ink. In addition to the self-dispersing carbon black, a dye may be used as another coloring material to adjust the color tone of the ink.

(Compatibleness of Self-dispersing Carbon Black with Salt)

In the above-described various kinds of self-dispersing carbon black, ammonium or organic ammonium is preferably used as M2 when, for example, —COO(M2), —SO$_3$(M2), —PO$_3$H(M2) or —PO$_3$(M2)$_2$ is used as the hydrophilic group bonded to the surface of carbon black. In this case, the salt used in combination therewith is preferably a salt in which M1 is identical with M2. More specifically, the present inventors have found, in the course of an investigation as to the effects by the addition of a salt to an ink containing self-dispersing carbon black, that when M2 (counter ion) in the hydrophilic group of the self-dispersing carbon black is made identical with M1, the stability of the ink is particularly improved. The reason why such an effect is achieved by making M1 identical with M2 is not clearly known. However, it is considered that since no salt interchange occurs between the counter ion in the hydrophilic group of the self-dispersing carbon black and the salt in the ink, the dispersion stability of the self-dispersing carbon black is stably retained.

When both M1 and M2 are determined to be ammonium or organic ammonium, the water resistance of printed images can be further improved in addition to the effect of stabilizing the properties of the ink. When Ph—COO(NH4) (ammonium benzoate) is used as the salt in the ink in this case, an excellent effect can be achieved even in the rejection performance of the ink from an orifice in an ink-jet head after suspending ink-jet recording.

(Colored Fine Particles/Microcapsulated Pigment)

As the coloring material, there may also be used a pigment microcapsulated with a polymer or the like, or colored fine particles which are resin particles covered with a coloring material.

With respect to the microcapsules, such a dispersing agent as described above is caused to further coexist in the ink to enhance the dispersion stability while they have good dispersibility in the aqueous medium in themselves. When the colored fine particles are used as a coloring material, such an anionic dispersing agent as described above is preferably used.

(Aqueous Medium)

No particular limitation is imposed on the aqueous dispersion in which such a coloring material as described above is dispersed, and the same aqueous medium as that used in the above-described liquid composition may be used. When the color ink is applied to a recording medium by an ink-jet method (for example, bubble-jet method), the ink is preferably prepared so as to have a desired viscosity and surface tension to give excellent ink-jet ejection properties as described above.

(Ink Set)

No particular limitation is imposed on the color tone of an ink making up an ink set in combination with the liquid composition, and the ink may be provided as an ink developing one color selected from among yellow, magenta, cyan, red, green, blue and black. Specifically, coloring materials may be suitably selected from among the above-mentioned coloring materials and used so as to provide an ink having a desired color.

The ink combined with the liquid composition is not limited to one kind, and two or more inks different in hue from each other may be combined to provide an ink set suitable for use in the formation of a multi color image. In this case, so far as at least one ink of the two or more inks is an ink exhibiting accelerated solid-liquid separation by interaction with the liquid composition and comprising a coloring material dispersed in an aqueous medium by the action of an ionic group, the other ink may be an ink containing a dye as a coloring material. It goes without saying that all the inks may be prepared as inks in which a coloring material is dispersed in an aqueous medium by the action of an ionic group. According to such an ink set, bleed, which comes to be a problem when a multi-color image is formed by an ink-jet apparatus, and occurs when inks different in hue from each other are applied adjoiningly on a recording medium, can be prevented. More specifically, the bleed becoming a problem in an multi-color image formed by an ink-jet apparatus tends to become particularly marked between a black ink and another color ink (at least one ink selected from among, for example, yellow ink, magenta ink, cyan ink, red ink, green ink and blue ink). Therefore, even in this embodiment, a black ink is preferably combined as an ink in which a coloring material is dispersed in an aqueous medium by the action of an ionic group so as to interact with the liquid composition. Other color inks may be provided as inks in which a dye is dissolved in an aqueous medium. It goes without saying that they may be provided as inks in which a coloring material is dispersed in an aqueous medium by the action of an ionic group like the black ink.

(Color Ink)

As dyes used as coloring materials for inks, there may be used conventionally known dyes, for example, acid dyes, direct dyes, disperse dyes, etc. As, for example, anionic dyes, most of both dyes already known and newly synthesized may be used so far as they have proper color tone and density. Some of them may also be used in combination. As specific examples of the anionic dyes, the following dyes may be named:

(Coloring Material for Yellow)
  C.I. Direct Yellow 8, 11, 12, 27, 28, 33, 39, 44, 50, 58, 85, 86, 87, 88, 89, 98, 100, 110 and 132;
  C.I. Acid Yellow 1, 3, 7, 11, 17, 23, 25, 29, 36, 38, 40, 42, 44, 76, 98 and 99;
  C.I. Reactive Yellow 2, 3, 17, 25, 37 and 42; and
  C.I. Food Yellow 3.

(Coloring Material for Red)
  C.I. Direct Red 2, 4, 9, 11, 20, 23, 24, 31, 39, 46, 62, 75, 79, 80, 83, 89, 95, 197, 201, 218, 220, 224, 225, 226, 227, 228, 229 and 230;
  C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;
  C.I. Reactive Red 7, 12, 13, 15, 17, 20, 23, 24, 31, 42, 45, 46 and 59; and
  C.I. Food Red 87, 92 and 94.

(Coloring Material for Blue)
  C.I. Direct Blue 1, 15, 22, 25, 41, 76, 77, 80, 86, 90, 98, 106, 108, 120, 158, 163, 168, 199 and 226;
  C.I. Acid Blue 1, 7, 9, 15, 22, 23, 25, 29, 40, 43, 59, 62, 74, 78, 80, 90, 100, 102, 104, 117, 127, 138, 158 and 161; and
  C.I. Reactive Blue 4, 5, 7, 13, 14, 15, 18, 19, 21, 26, 27, 29, 32, 38, 40, 44 and 100.

(Coloring Material for Black)
  C.I. Direct Black 17, 19, 22, 31, 32, 51, 62, 71, 74, 112, 113, 154, 168 and 195;
  C.I. Acid Black 2, 48, 51, 52, 110, 115 and 156; and
  C.I. Food Black 1 and 2.

The content of the coloring material in each of the color inks may be suitably selected in the way that they have excellent ink-jet ejection properties and the desired color and density when used in, for example, ink-jet recording. For example, as a standard, it is preferably within a range of from 3 to 50% by weight based on the total weight of the ink. The amount of water contained in the ink is preferably within a range of from 50 to 95% by weight based on the total weight of the ink.

(Recording Process)

The liquid composition can be combined with an ink in which a coloring material is dispersed in an aqueous medium by the action of an ionic group to provide an ink set which can give high-quality images with high image density and coloring by adopting a recording process comprising the steps of:

(i) applying the ink to a recording medium; and (ii) applying the liquid composition to at least a region on the recording medium, to which the ink is applied.

The reason why such an ink set can give high quality images with high image density and coloring is not clearly known, but is considered to be attributable to the fact that, for example, when the liquid composition and the ink are ejected on, and adhere to, the surface of paper by an ink-jet method, solid-liquid separation quickly occurs after being applied to the paper surface while a coloring material such as a pigment is stably dispersed or dissolved in the ink. More specifically, if the solid-liquid separation occurs slowly, the ink diffuses into the paper when the paper has high permeability. As a result, the sharpness (character quality) of characters printed is impaired, and besides, the image density is naturally lowered because the ink deeply penetrates into the paper. However, it is considered that the ink according to this embodiment quickly undergoes solid-liquid separation, and so such a phenomenon as described above hardly occur even in paper having relatively high permeability. In other words, factors depending on the kinds of paper, such as the degree of permeability, are considered to become negligible. Further, it is also naturally considered that the quickness of solid-liquid separation enhances the fixing ability of the ink to the recording medium.

When the ink set comprising the above-described ink and liquid composition is used in ink-jet recording or the like, various recording processes, such as cases where a) the liquid composition is applied, and the ink is then applied, b) the ink is applied, and the liquid composition is then applied, and c) the ink is applied, the liquid composition is then applied, and the ink is further applied, are considered.

Figure 8A:
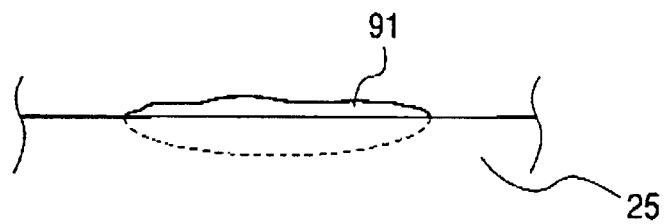
FIGS. 8A and 8B schematically illustrate a recording process according to an embodiment of the present invention.
Figure 8B:
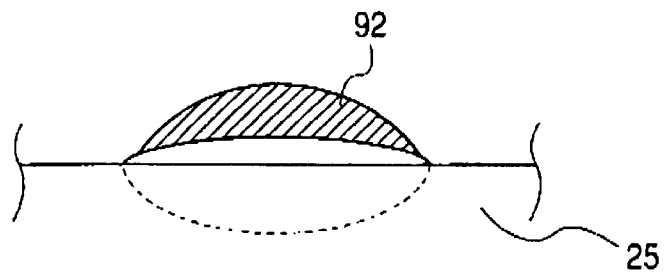

A process for applying the ink and liquid composition may be suitably selected according to, for example, the required quality of a print, and the like. According to, for example, the recording process a), the print quality can be made particularly good. According to the investigation by the present inventors, the reason for it is considered to be as follows. Namely, in the recording process a), a liquid composition 91 is first applied to a recording medium (see FIG. 8A). An ink 92 is then applied to an area of the recording medium, to which the liquid composition 91 has been applied (see FIG. 8B). Therefore, the coloring material in the ink undergoes solid-liquid separation by interaction with a salt in the liquid composition 91 present on the surface of the recording medium 25 from right after the ink 92 has been applied to the recording medium 25. As a result, the coloring material in the ink can be more retained on the surface of the recording medium 25, so that an excellent printing effect, whereas blurs are extremely slight and density is high, can be achieved.

An ink set suitable for use in the formation of color images can be provided by combining ink sets each comprising the liquid composition and any of the color inks with each other, or an ink set comprising the liquid composition and the color ink with other color ink(s). When such an ink set is used, and, for example, the above-described ink set is used in a black ink to conduct such recording that a black-image portion and a color-image portion adjoin each other, the occurrence of bleed can be extremely effectively prevented. The reason why such an ink set can effectively prevent the occurrence of bleed is not clearly known. However, it is considered to be attributable to the fact that solid-liquid separation after the ink set of the black ink is applied to a recording medium, and subsequent solidification of the coloring material quickly occur, and the black ink hardly bleeds into the color-ink side at the boundary portion in the color image.

(Ink Properties; Ink-jet Ejection Properties and Penetrability into Recording Medium)

The ink sets according to the respective embodiments described above can be suitably used as ink sets for ink-jet recording. Ink-jet recording methods include a recording method in which mechanical energy is applied to an ink to eject droplets of the ink, and a recording method in which thermal energy is applied to an ink to eject droplets of the ink by bubbling the ink. The liquid compositions and inks according to the present invention are particularly suitable for use in these recording methods. When the liquid compositions and inks according to the respective embodiments described above are used in Ink-jet recording, the liquid compositions and inks preferably have properties such that they can be ejected from an ink-jet head. From the viewpoint of the ejection properties from the ink-jet head, they are preferably controlled so as to have, as their physical properties, a viscosity of 1 to 15 cP, particularly 1 to 5 and a surface tension of 25 mN (dyn/cm) or higher, particularly 25 to 50 mN (dyn/cm).

(Ink-jet Recording Technique)

Ink-jet recording techniques in which the liquid compositions and inks according to this embodiment can be suitably used will hereinafter be described.

Figure 2:
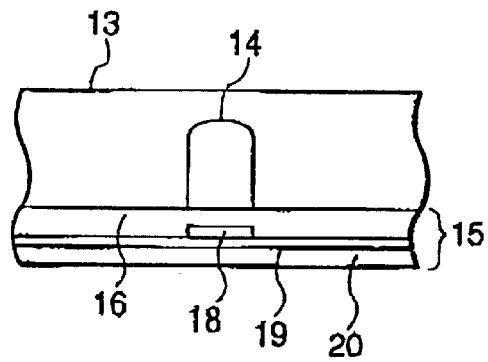
FIG. 2 is a transverse cross-sectional view illustrating the exemplary head of the ink-jet recording apparatus.

An exemplary construction of a head, which is a main component of an apparatus making use of thermal energy as an ink-jet recording apparatus, is shown in FIGS. 1 and 2.

FIG. 1 is a cross-sectional view of a head 13 taken along a flow path of ink, and FIG. 2 is a cross sectional view taken along line 2—2 in FIG. 1. A head 13 is formed by bonding a glass, ceramic, silicon or plastic plate or the like having a flow path (nozzle) 14 through which an ink is passed, to a heating substrate 15. The heating substrate 15 is composed of a protective layer 16 made of silicon oxide, silicon nitride, silicon carbide or the like, electrodes 17-1 and 17-2 formed of aluminum, gold, aluminum-copper alloy or the like, a heating resistor layer 18 formed of a high-melting material such as, $HfB_2$, TaN or TaAl, a heat accumulating layer 19 formed of silicon oxide, aluminum oxide or the like, and a substrate 20 made of silicon, aluminum, aluminum nitride or the like having good heat dissipation properties.

Upon application of pulsed electric signals to the electrodes 17-1 and 17-2 of the head 13, the heating substrate 15 rapidly generates heat at the region shown by "n" to produce bubbles in an ink 21 which is in contact with this region. A meniscus 23 of the ink is projected by the pressure thus produced, and the ink 21 as droplets 24 is ejected from an ejection opening 22 through the nozzle 14 of the head 13 toward a recording medium 25.

Figure 3:
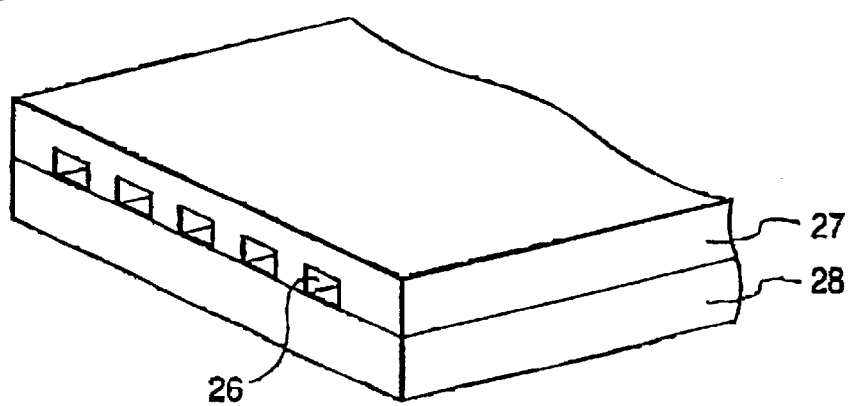
FIG. 3 is a perspective view illustrating the appearance of a multi-head in which such a head as shown in FIG. 1 is set in an array.

FIG. 3 illustrates the appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
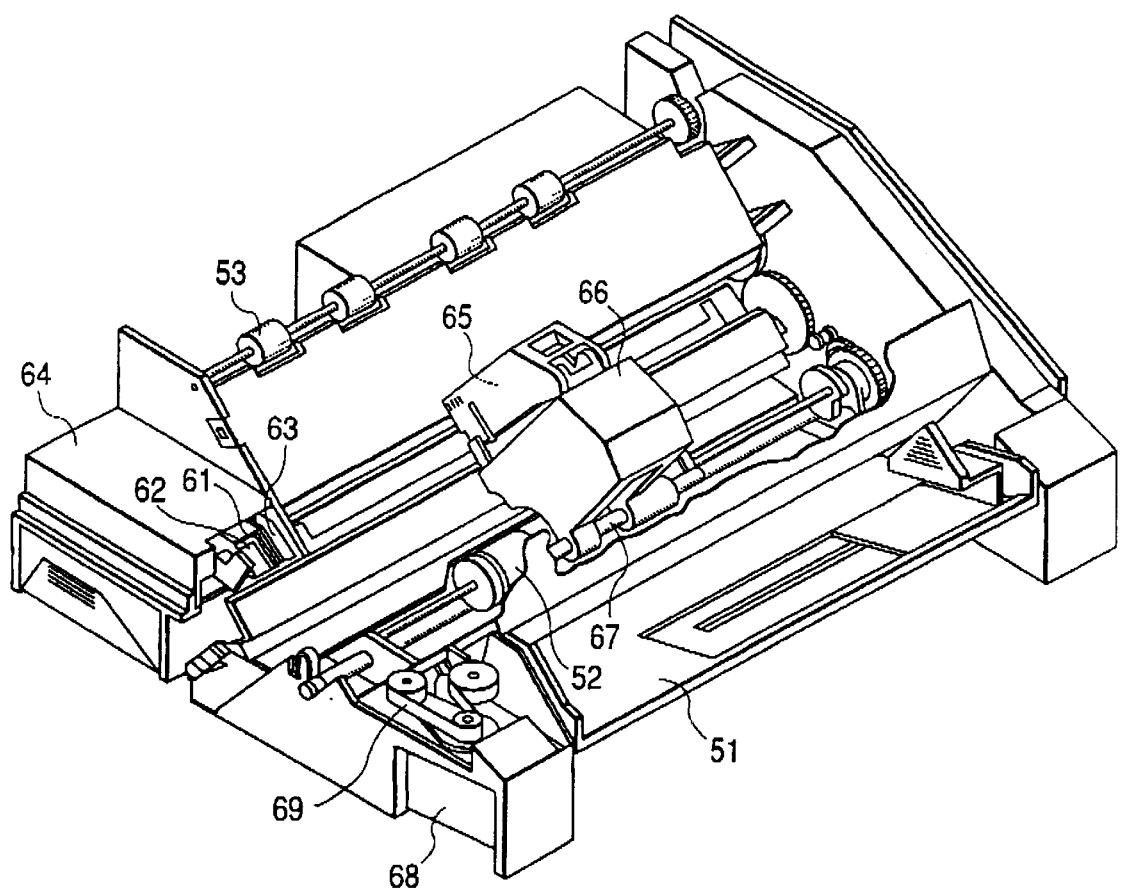
FIG. 4 is a schematic perspective view illustrating an embodiment of an ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to carry out capping. Reference numeral 63 denotes an ink absorbing member provided adjoiningly to the blade 61 and, like the blade 61, is held in such a form that it protrudes into the course through which the recording head 65 is moved. The above-described blade 61, the cap 62 and the ink absorbing member 63 constitute an ejection-recovery portion 64, where the blade 61 and the ink absorbing member 63 remove water, dust and/or the like from the face of the ink-ejecting openings, and also constitute a recovery-system unit by which the respective inks in the recording head, and an ink located at the ejection opening of the liquid composition, and the like are sucked through the cap 62 by a pump (not illustrated) to recover the ejection performance inherent in the recording head for the inks or the inks and liquid composition. If such an ink set as described in the present invention is used, even when both liquid composition and ink are ejected by the ink-jet recording apparatus, it is unnecessary to separately provide recovery systems for the ink and liquid composition, because the liquid composition and the ink in which a coloring material is dispersed in an aqueous medium by the action of an ionic group, do not react with each other by simply mixing them as described above, and so the function of the recovery system is not impaired with time even when the recovery system can be made common to the liquid composition and the ink.

Reference numeral 65 designates the recording head having an ejection-energy-generating means and serving to eject the ink onto a recording medium set opposite to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) with a belt 69 driven by a motor 68. Thus, the carriage 66 can be moved along the guide shaft 67, and hence, the recording head 65 can be moved from a recording region to a region adjacent thereto. Reference numerals 51 and 52 denote a feeding part from which the recording medium is inserted, and feed rollers driven by a motor (not illustrated), respectively.

With such a construction, the recording medium is fed to the position opposite to the ejection opening face of the recording head 65, and discharged from a discharge section provided with discharge rollers 53 with the progress of recording. In the above construction, the cap 62 in the ejection-recovery portion 64 recedes from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to carry out capping, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The recording head 65 is moved to its home position not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement (Ink Cartridge)

Figure 5:
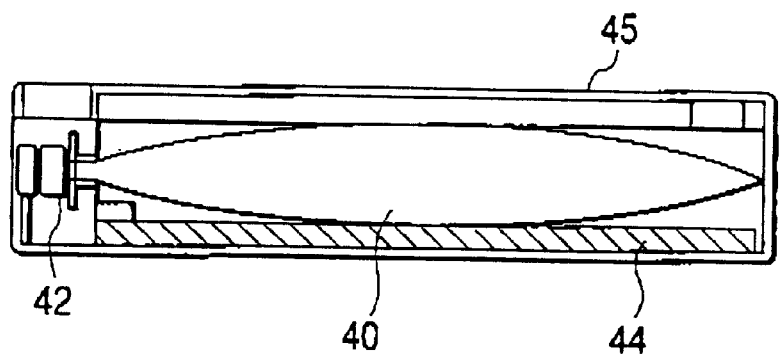
FIG. 5 is a longitudinal cross-sectional view illustrating an exemplary ink cartridge.
Figure 9:
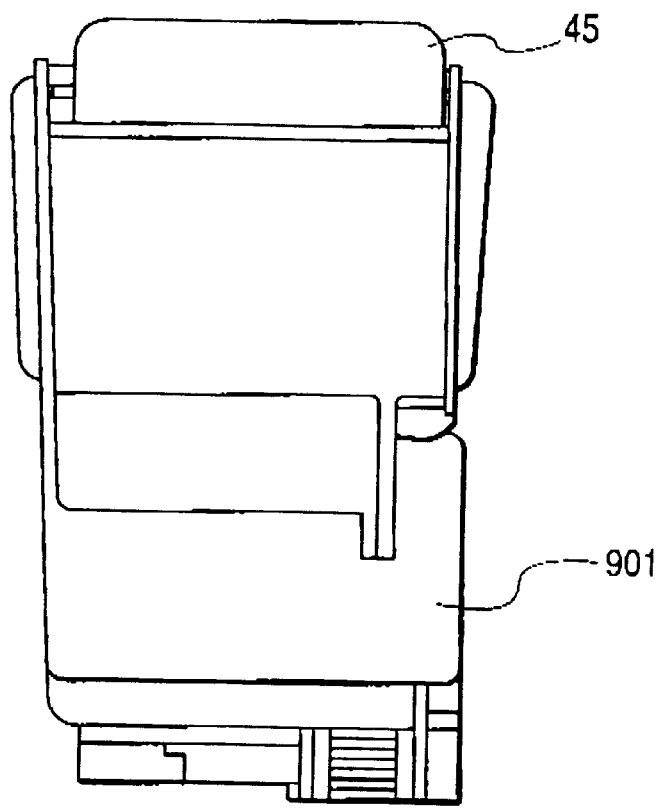
FIG. 9 is a schematic plan view illustrating a state that an ink cartridge according to an embodiment of the present invention has been installed in a recording head.

FIG. 5 illustrates an exemplary ink cartridge 45 in which an ink or liquid composition to be fed to a head through a member for feeding the ink or liquid composition, for example, a tube, is contained. Here, reference numeral 40 designates an ink container portion containing the ink or liquid composition to be fed, as exemplified by a bag. One end thereof is provided with a stopper 42 made of rubber. A needle (not illustrated) may be inserted into this stopper 42 so that the ink or liquid composition in the bag 40 can be fed to the head. Reference numeral 44 indicates an absorbing member for receiving a waste ink or liquid composition. It is preferred that the ink container portion 40 is formed of a polyolefin, in particular, polyethylene, at its face with which the ink or liquid composition comes into contact. Such a cartridge is so constructed that it is detachably installed in a recording head 901, from which the ink or liquid composition is ejected, as illustrated in, for example, FIG. 9, and that the ink or liquid composition is fed to the recording head 901 when the cartridge 45 is installed in the recording head 901.

A cartridge according to another embodiment of the present invention may be so constructed that it has two container portions separately containing the liquid composition and the ink, is detachably installed in a recording head for ejecting the ink and the liquid composition and can fed the ink and the liquid composition to the recording head.

Figure 10:
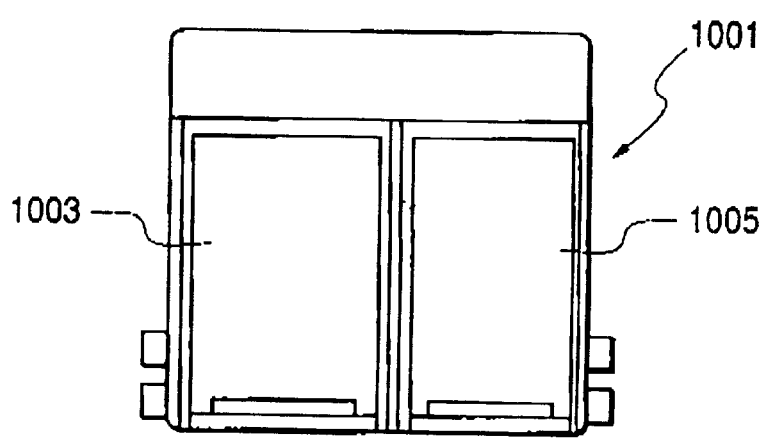
FIG. 10 is a schematic plan view illustrating an ink cartridge according to another embodiment of the present invention.
Figure 11:
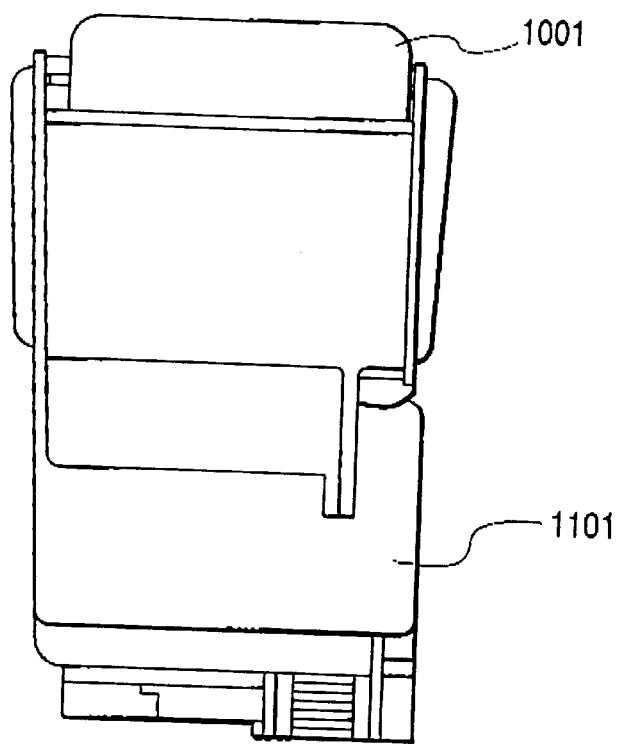
FIG. 11 is a schematic plan view illustrating a state that the ink cartridge shown in FIG. 10 has been installed in a recording head.

FIG. 10 illustrates an example of such a cartridge 1001. Reference numerals 1003 and 1005 indicate a container portion for the liquid composition and a container portion for the ink, respectively. This cartridge Is so constructed that it is detachably installed in a recording head 1101, from which the ink and the liquid composition can be ejected, as illustrated in FIG. 11, and that the liquid composition and the ink are fed to the recording head 1101 when the cartridge 1001 is installed in the recording head 1101.

Figure 12:
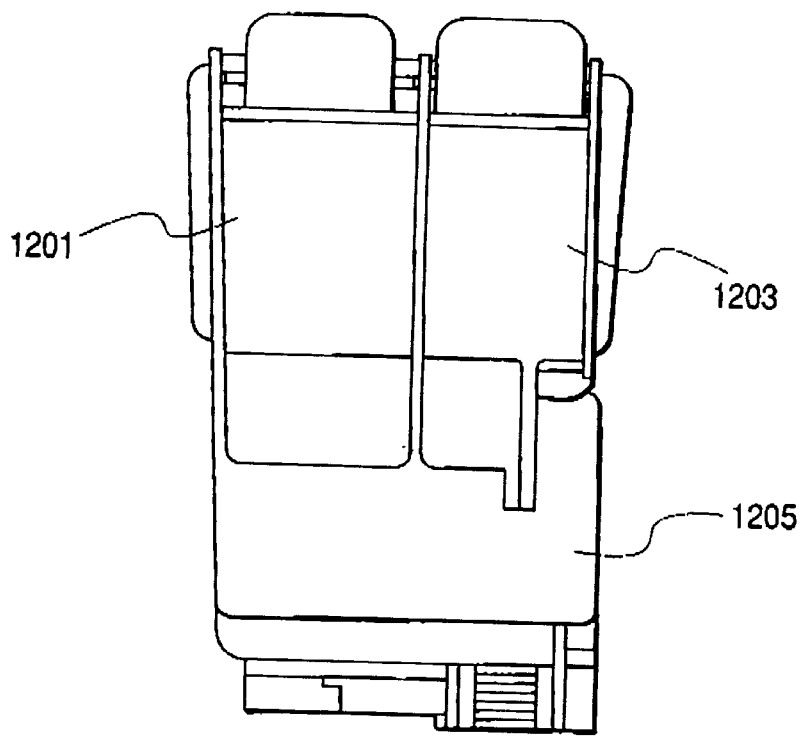
FIG. 12 is a schematic plan view illustrating a state that ink cartridges for an ink set according to a further embodiment of the present invention have been installed in a recording head.

The cartridges for ink set according to the present invention are not limited to only that constructed by physically uniting the container portion for the liquid composition and the container portion for the ink as illustrated in FIG. 10. For example, such a cartridge for an ink set as illustrated in FIG. 12 is also embraced in the scope of the present invention, where the cartridge is so constructed that a cartridge portion 1201 containing the liquid composition and a cartridge portion 1203 containing the ink are installed in a common recording head 1205 ejecting each of the liquid composition and the ink, in such a manner that the liquid composition and the ink an be used to record an ink-jet image.

(Recording Unit)

Figure 6:
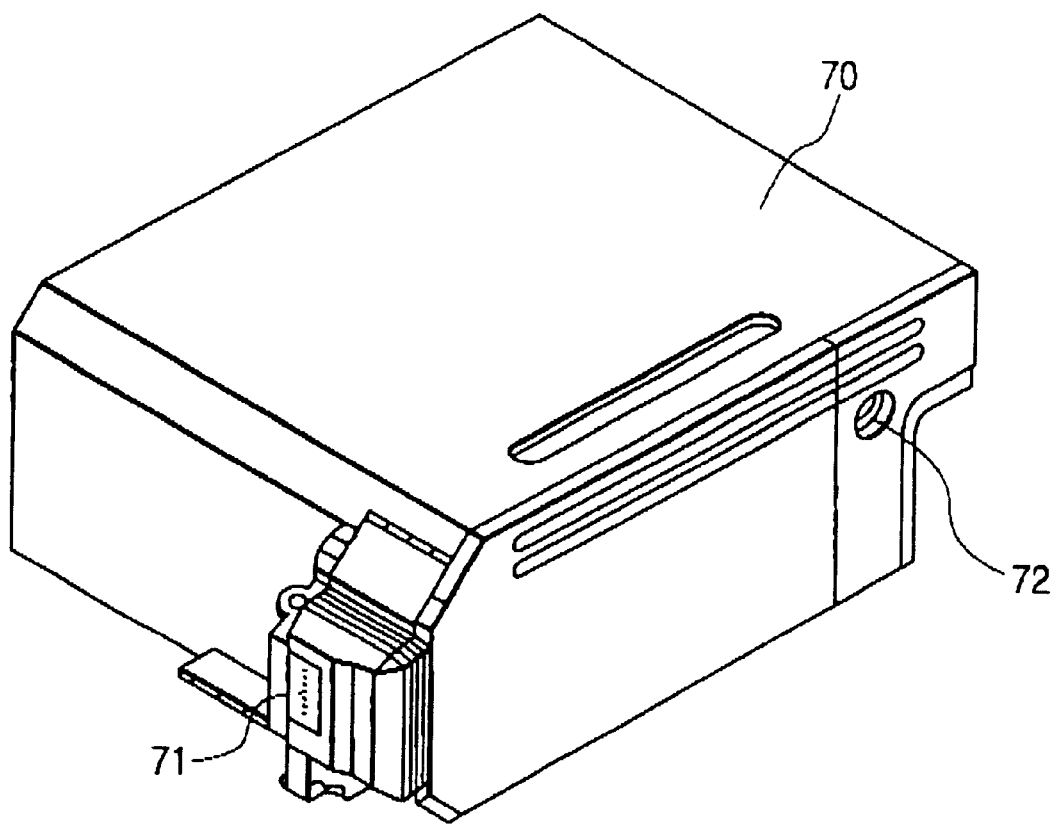
FIG. 6 is a perspective view illustrating an exemplary recording unit.

The ink-jet recording apparatus used in the present invention are not limited to the apparatus as described above in which the head and the cartridge are separately provided. Therefore, a device in which these members are integrally formed as shown in FIG. 6 can also be preferably used. In FIG. 6, reference numeral 70 designates a recording unit, in the interior of which a container portion-containing the ink or liquid composition is contained. When, for example, the ink is contained, an ink absorbing member is contained therein. The recording unit 70 is so constructed that the ink in such an ink absorbing member is ejected In the form of ink droplets through a head 71 having a plurality of orifices. In the present invention, polyurethane is preferably used as a material for the ink absorbing member.

Without using the ink absorbing member, the recording unit may be so constructed that the ink container portion is a bag internally provided with a spring or the like. Reference numeral 72 indicates an air passage for causing the interior of the recording unit 70 to communicate with the atmosphere. This recording unit 70 is used in place of the recording head 65 shown in FIG. 4, and is detachably installed in the carriage 66.

Figure 13:
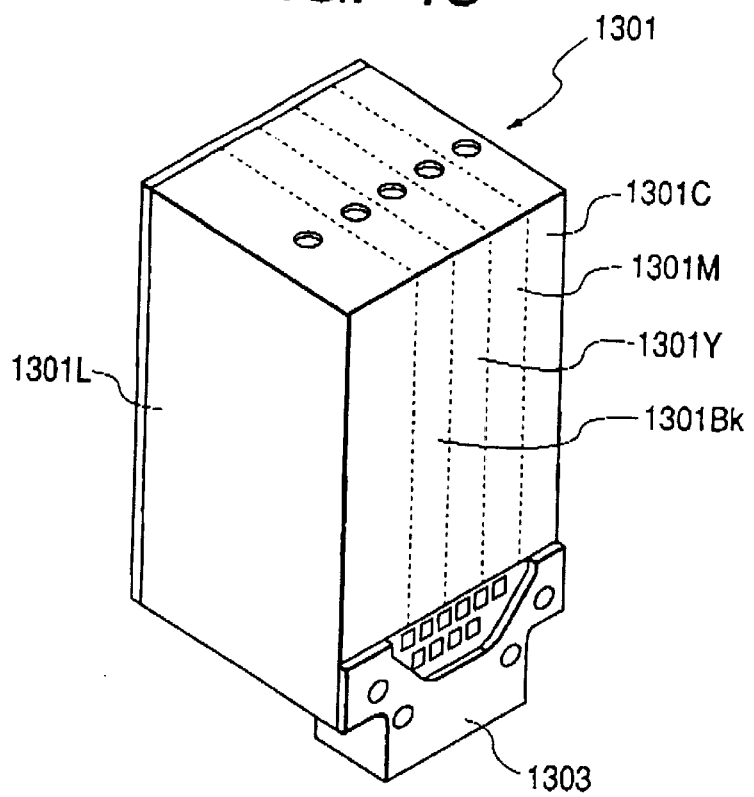
FIG. 13 is a schematic perspective view illustrating a recording unit according to another embodiment of the present invention.

A recording unit according to another embodiment of the present invention has ink container portions in an ink tank, which respectively contain the liquid composition and at least one ink selected from among the color inks respectively having hues of yellow, magenta, cyan, red, green, blue and black, and is integrally equipped with a recording head for ejecting the respective inks. Specifically, it is exemplified by a recording unit 1301 as shown in FIG. 13 comprising a container portion 1301L containing the liquid composition, a container portion 1301Bk containing the black ink in which a coloring material is dispersed in an aqueous medium by the action of an ionic group, and container portions 1301Y, 1301C and 1301M respectively containing color inks of yellow, cyan and magenta and equipped with a recording head 1303 in which ink flow paths are separately formed in such a manner that the liquid composition and the four inks different in hue from one another can be separately ejected.

As a form of the second ink-jet recording apparatus making use of mechanical energy, an On-Demand type ink-jet recording head is shown which comprises a nozzle-formed substrate having a plurality of nozzles, pressure-generating devices composed of a piezoelectric material and an electrically conductive material provided opposite to the nozzles, and an ink filled around the pressure-generating devices, wherein the pressure-generating devices are made to undergo displacement by voltage applied to eject droplets of the ink from the nozzles. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 and undergoing displacement according to an electrical signal, and a substrate 84 for supporting and fixing the orifice plate 81, the vibration plate 82 and the like thereon.

Figure 7:
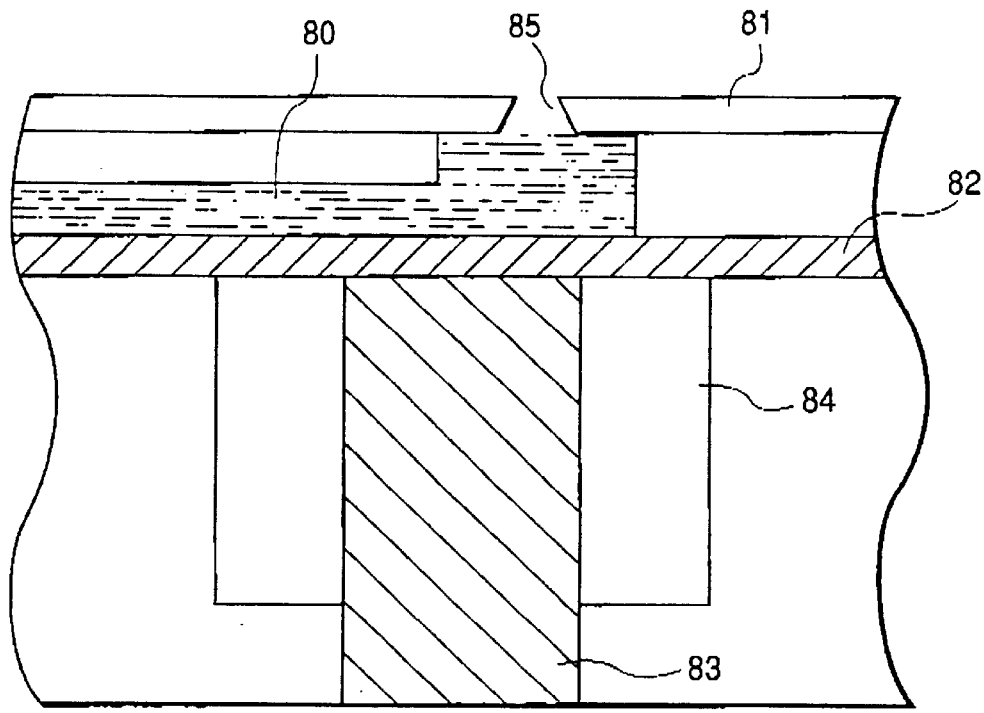
FIG. 7 is a perspective view illustrating another exemplary construction of an ink-jet recording head.

In FIG. 7, the ink flow path 80 is formed out of a photosensitive resin or the like. The orifice plate 81 is made of a metal, such as stainless steel or nickel, and is provided with an ejection opening 85 formed by electroforming, punching by press working, or the like. The vibration plate 82 is formed out of a film of a metal such as stainless steel, nickel or titanium and a high-modulus resin film or the like. The piezoelectric element 83 is made of a dielectric material, such as barium titanate or PZT. The recording head with the above construction is operated in such a manner that pulsed voltage is applied to the piezoelectric element 83 to generate a strain stress, the vibration plate 82 bonded to the piezoelectric element 83 is strained by the energy of the stress, and the ink in the ink flow path 80 is thus perpendicularly pressurized to eject ink droplets (not illustrated) from the ejection opening 85 of the orifice plate 81, thereby conducting recording. Such a recording head is used by incorporating it into an ink-jet recording apparatus similar to that illustrated in FIG. 4. Operation of details of the ink-jet recording apparatus may be conducted in the same manner as described above.

(Recording Apparatus and Recording Process Using Ink Set)

Figure 14:
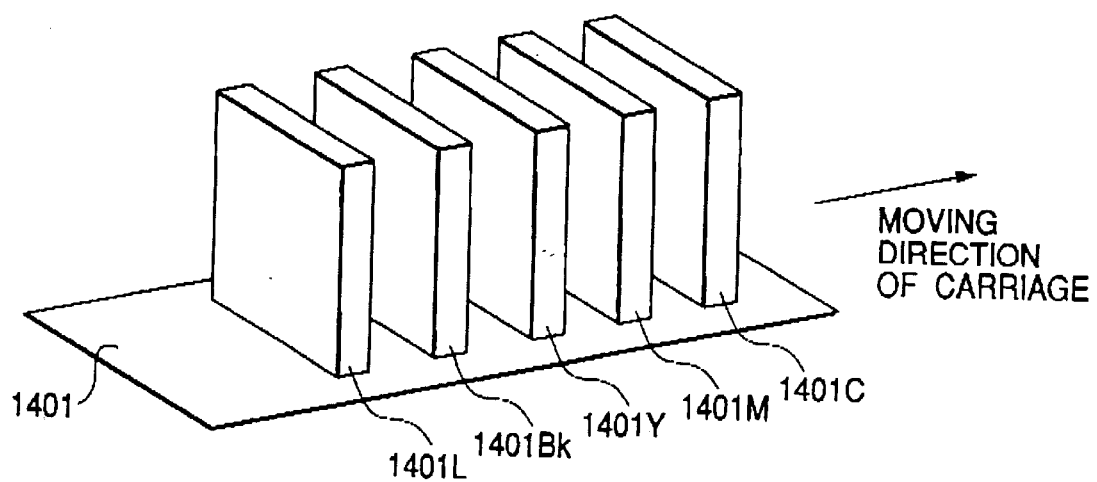
FIG. 14 schematically illustrates a state that a recording unit holding a liquid composition, a recording unit holding a black ink containing a coloring material dispersed in an aqueous medium by the action of an ionic group, and recording units respectively holding cyan, magenta and yellow color inks in an ink set according to an embodiment of the present invention have been mounted on the same cartridge.
Figure 15:
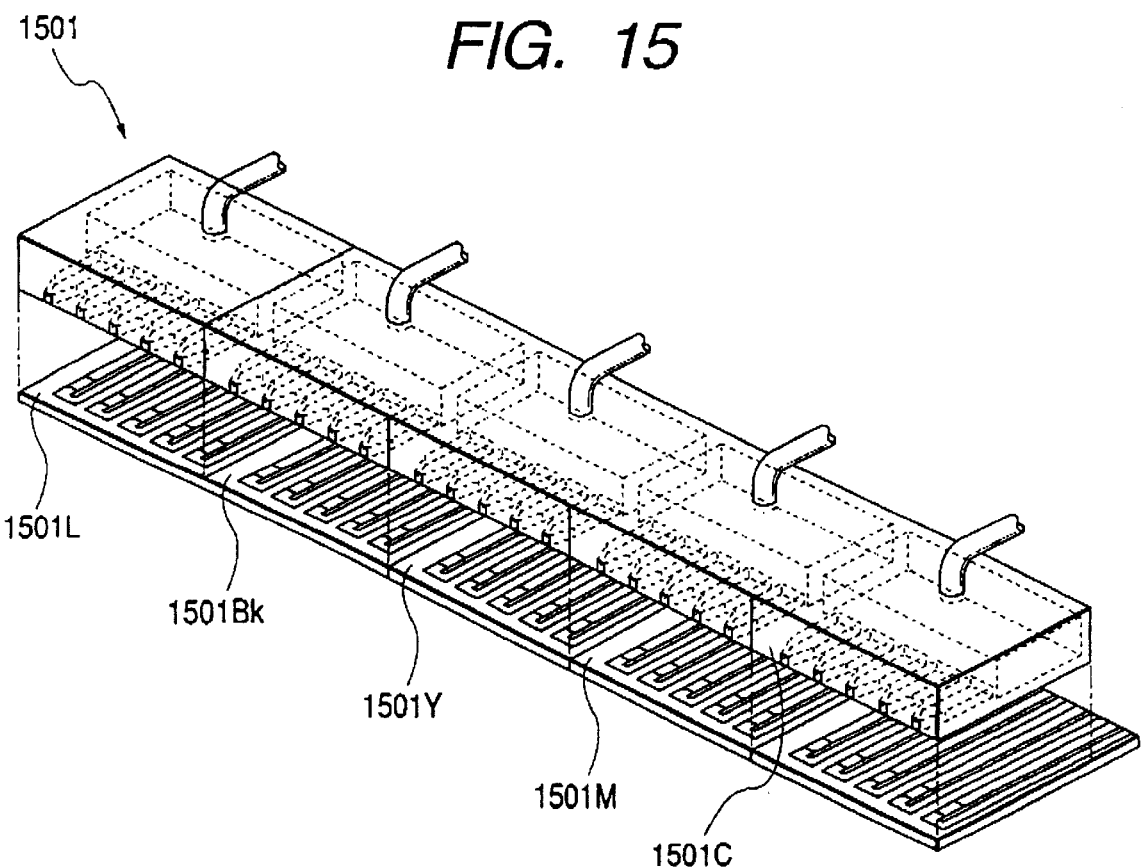
FIG. 15 is an enlarged view illustrating an orifice part of a recording head according to an embodiment in the ink-jet recording apparatus shown in FIG. 4.

When an ink set is used to record color images, for example, a recording apparatus can be used in which, for example, five recording heads, each of which has been illustrated in FIG. 3, are arranged on a carriage 1401. An embodiment thereof is illustrated in FIG. 14. Reference characters 1401L, 1401Bk, 1401Y, 1401M and 1401C indicate recording units for ejecting the liquid composition, the black ink containing carbon black dispersed in an aqueous medium by the action of an ionic group, and inks of yellow, magenta and cyan colors, respectively. The recording units are arranged on the carriage of the above-described recording apparatus and eject the respective color inks according to recording signals. The liquid composition is applied to at least portions of recording paper where the color inks or at least one ink of the color inks is applied thereto before the ejection of the inks, or after the application of the inks. FIG. 14 shows the case where the five recording units are used. However, the present invention is not limited thereto. For example, the following embodiment is also included, wherein ink cartridges 1501L, 1501Bk, 1501Y, 1501M and 1501C containing the liquid composition, a black ink containing carbon black dispersed in an aqueous medium by the action of an ionic group, and the color inks of yellow, magenta and cyan color inks, respectively, are set in a recording head 1501 in which ink flow paths are separately formed in such a manner that the liquid composition and color inks fed from the ink cartridges 1501L, 1501Bk, 1501Y, 1501M and 1501C can be separately ejected by one recording head as shown in FIG. 15, thereby conducting recording.

Figure 16:
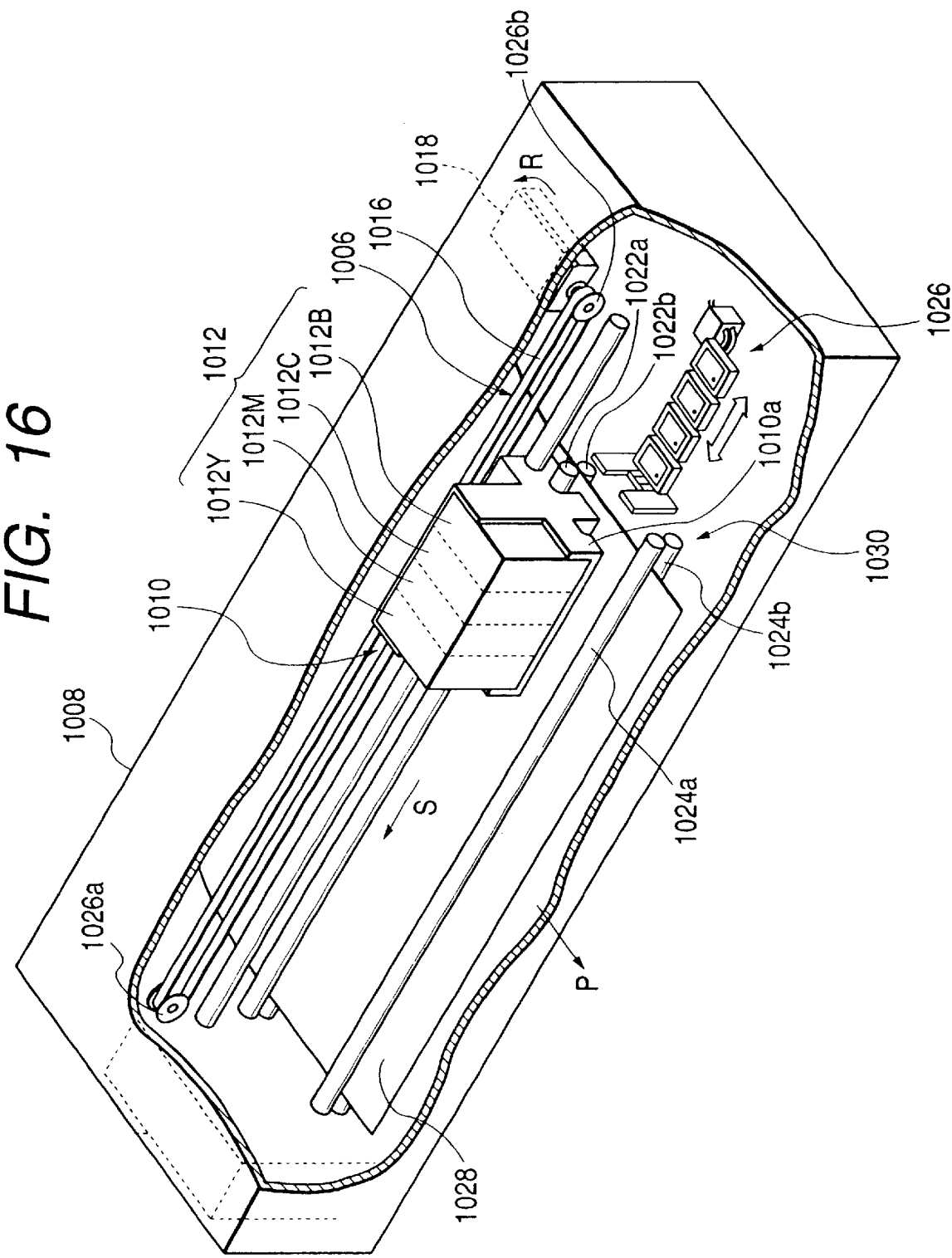
FIG. 16 is a schematic perspective view illustrating principal parts in an exemplary ink-jet printer capable of installing a liquid-ejecting head.

Other specific examples of the recording apparatus and recording heads preferably used in the present invention will hereinafter be described. FIG. 16 is a schematic perspective view illustrating principal parts of a liquid-ejecting head of an ejection system in which a bubble communicates with the air upon ejection of the liquid composition or ink making up an ink set according to the present invention, and an exemplary ink-jet printer as a liquid-ejecting apparatus using this head.

In FIG. 16, the ink-jet printer comprises a conveying device 1030 and paper conveying roller units 1024a and 1024b for intermittently conveying paper 1028 as a recording medium provided along the longitudinal direction in a casing 1008 in a direction shown by an arrow P in FIG. 16, a recording part 1010 reciprocatively moved in a direction substantially parallel to a direction S substantially perpendicular to the conveying direction P of the paper 1028 by the conveying device 1030, and a driving part 1006 as a driving means for reciprocatively moving the recording part 1010.

The driving part 1006 comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 arranged in substantial parallel with roller units 1022a and 1022b in forward and reverse directions.

When the motor 1018 is operated to rotate the belt 1016 in a direction shown by an arrow R in FIG. 16, the carriage member 1010a of the recording part 1010 is moved by the prescribed movement in the direction shown by the arrow S in FIG. 16. When the motor 1018 is operated to rotate the belt 1016 in a direction reverse to the direction shown by the arrow R in FIG. 16, the carriage member 1010a of the recording part 1010 is moved by the prescribed movement in a direction reverse to the direction shown by the arrow S in FIG. 16. At an end of the driving part 1006, a recovery unit 1026 for conducting an ejection-recovery treatment for the recording part 1010 is provided opposite to an array of ink-ejection openings of the recording part 1010 at the home position of the carriage member 1010a.

In the recording part 1010, ink-jet cartridges (hereinafter also referred to merely as "cartridges" in some cases) 1012Y, 1012M, 1012C and 1012B for respective colors, for example, yellow, magenta, cyan and black, are detachably mounted on a carriage member 1010a.

Figure 17:
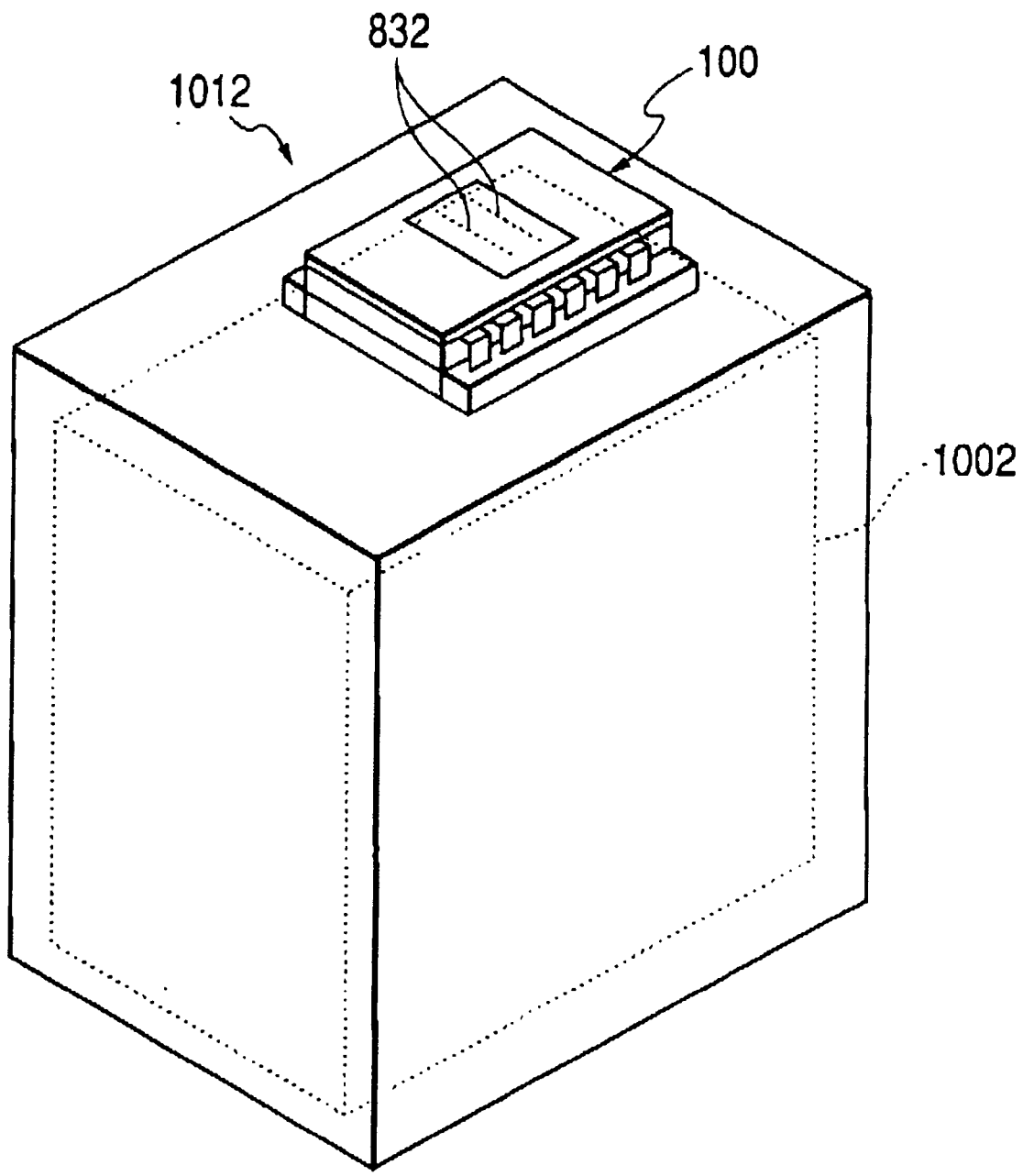
FIG. 17 is a schematic perspective view illustrating an exemplary ink-jet cartridge equipped with the liquid-ejecting head.

FIG. 17 illustrates an exemplary ink-jet cartridge capable of being mounted on the ink-jet recording apparatus. The cartridge 1012 in this embodiment is of a serial type, and its principal part is constructed by an ink-jet recording head 100 and a liquid tank 1002 for containing a liquid such as an ink.

In the ink-jet recording head 100, a great number of ejection openings 832 for ejecting the liquid are formed, and the liquid such as an ink is directed to a common liquid chamber (see FIG. 18) in the liquid-ejecting head 100 through a liquid feed passage (not illustrated) from the liquid tank 1002. The cartridge 1012 is so constructed that the ink-jet recording head 100 and the liquid tank 1002 are integrally formed, and the liquid can be supplied to the interior of the liquid tank 1002 as needed. However, a structure where the liquid tank 1002 is replaceably joined to this liquid-ejecting head 100 may also be adopted.

A specific example of the above-described liquid-ejecting head capable of being mounted on the ink-jet printer of such a construction will hereinafter be described in detail.

Figure 18:
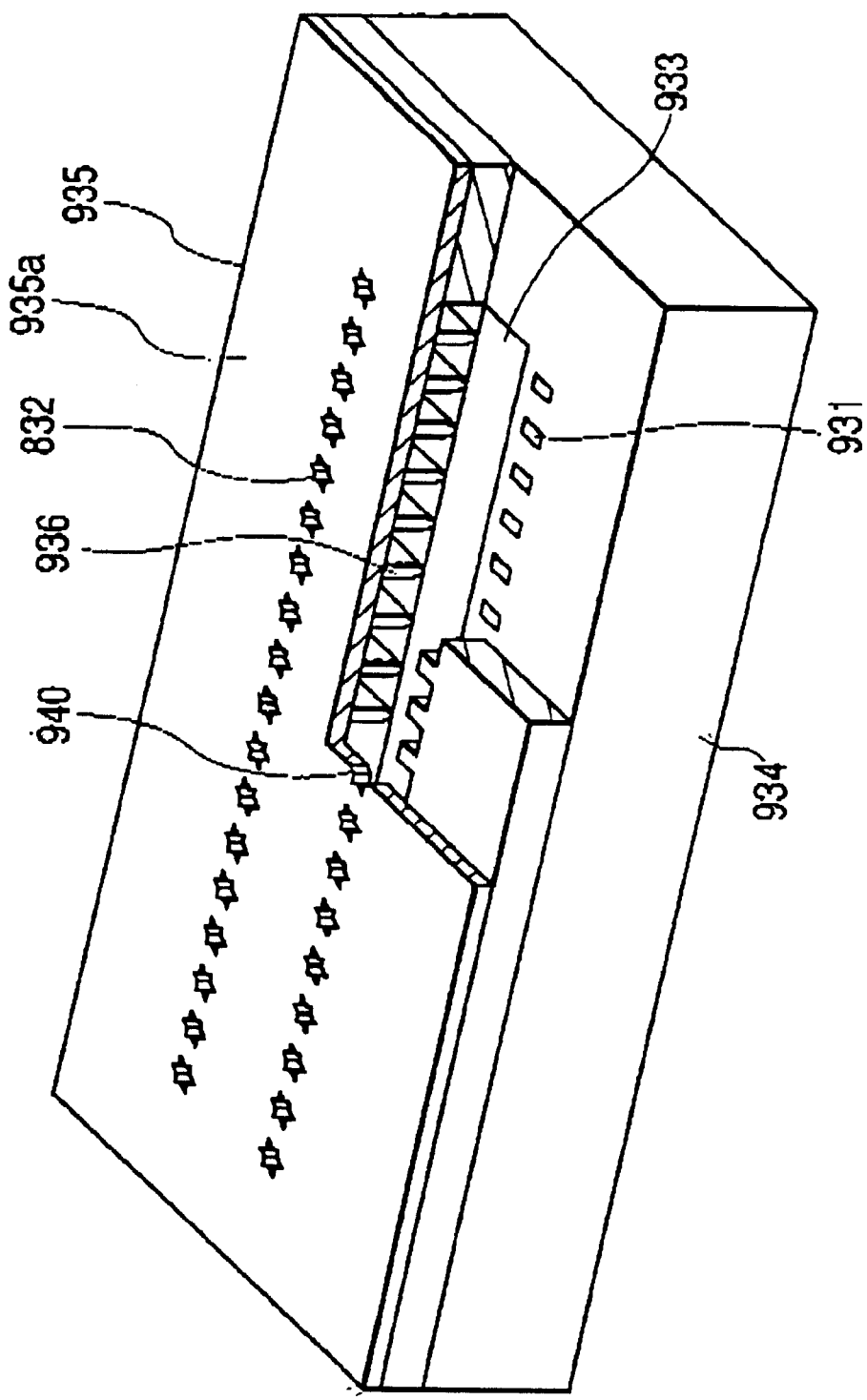
FIG. 18 is a schematic perspective view illustrating principal parts of an exemplary liquid-ejecting head.

FIG. 18 is a schematic perspective view typically illustrating principal parts of a liquid-ejecting head showing the basic form of the present invention, and FIGS. 19 to 22 are front views illustrating the form of ejection openings of the liquid-ejecting head shown in FIG. 18. Electrical wiring and the like for driving electrothermal converters are omitted.

In the liquid-ejecting head according to this embodiment, such a substrate 934 composed of glass, ceramic, plastic or metal as illustrated in, for example, FIG. 18 is used. The material of such a substrate is not essential to the present invention and is not particularly limited so far as it functions as a part of a flow-path forming member and as a support for an ink ejection-energy-generating element and a material layer for forming a liquid flow path and ejection openings, which will be described later. Therefore, in this embodiment, a description is provided in the case where an Si substrate (wafer) is used. The ejection openings can be formed in accordance with not only a forming process by laser beam, but also, for example, a process in which a photosensitive resin is used as an orifice plate (ejection-opening plate) 935, which will be described later, to form openings by means of an exposure device such as MPA (mirror projection aliner).

In FIG. 18, reference numeral 934 indicates a substrate equipped with electrothermal converters (hereinafter also referred to as "heater" in some cases) 931 and an ink feed opening 933 formed of a long-grooved through-opening as a common liquid chamber. The heaters 931, which are thermal energy-generating means, are arranged in zigzag form in a row on both sides of the ink feed opening 933 along the longitudinal direction thereof with an interval of, for example, 300 dpi between the electrothermal converters. Ink passage walls 936 for forming ink flow paths are provided on the substrate 934. Further, an ejection- opening plate 935 equipped with ejection openings 832 is provided on the ink passage walls 936.

In this embodiment, the serial type head is used to conduct recording at, for example, 1,200 dpi in which recording is conducted while the head is scanned in the direction shown by the arrow S in FIG. 16 and is used to conduct recording at, for example, 1,200 dpi. The driving frequency is 10 kHz, and ejection is conducted at the shortest time interval of 100 $\mu$s in one ejection opening.

Figure 19:
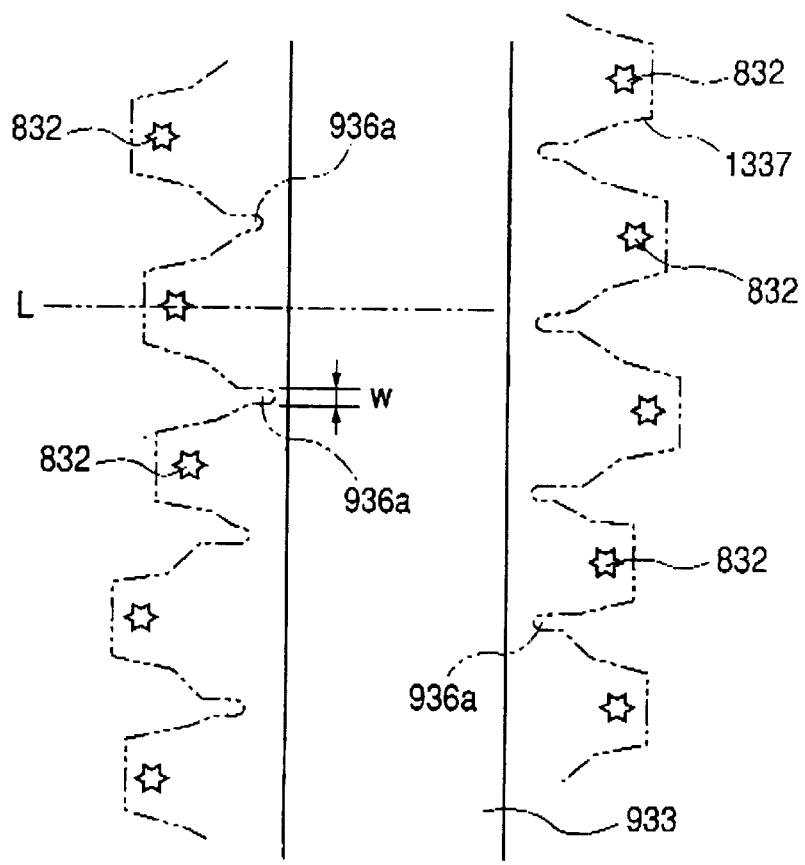
FIG. 19 is a conceptual view illustrating a part extracted from the exemplary liquid-ejecting head.
Figure 22:
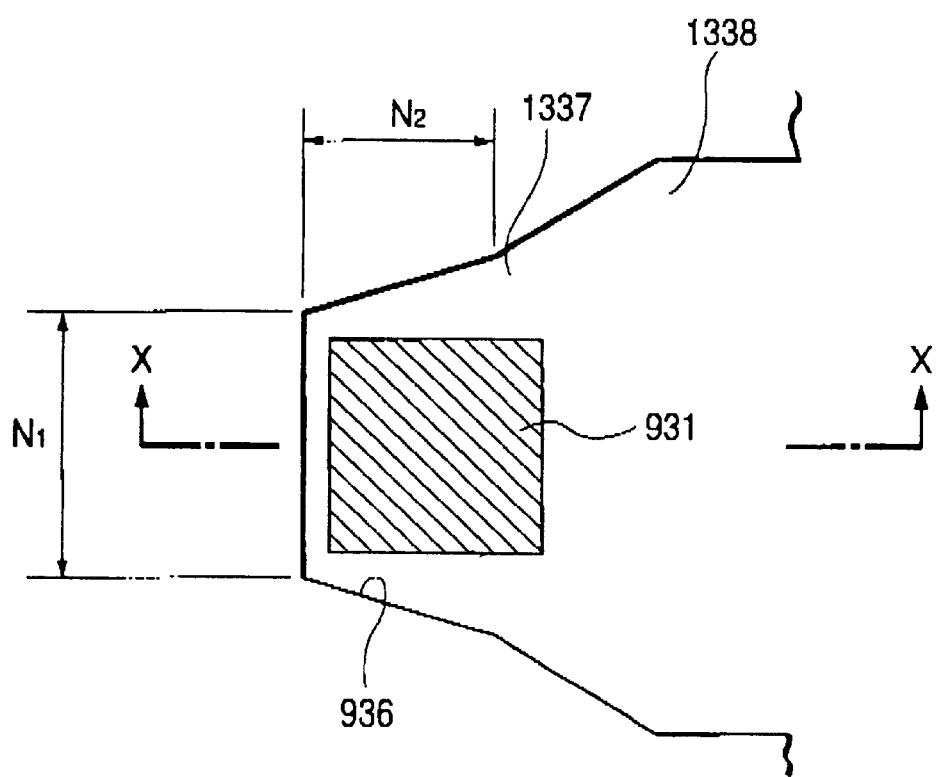
FIG. 22 schematically illustrates a principal part in FIG. 19.

As an example of the dimensions of the head, from the viewpoint of separating fluid, a partition wall 936 a for isolating adjacent nozzles from each other has a width of 14 $\mu$m as illustrated in, for example, FIG. 19. As illustrated in FIG. 22, a bubbling chamber 1337 formed by the walls 936 for ink flow path has $N_1$ (width of the bubbling chamber) of 33 $\mu$m and $N_2$ (length of the bubbling chamber) of 35 $\mu$m. The size of the heater 931 is 30 $\mu$m, the resistance value of the heater is 53 $\Omega$, and the driving voltage is 10.3 V. The heights of the ink passage wall 936 and the partition wall 936a are 12 $\mu$m, and the thickness of the ejection-opening plate is 11 $\mu$m.

In the section of an ejection opening part 940 provided in the ejection-opening plate including ejection openings 832, a section taken along a direction intersecting the ink-ejecting direction (thickness-wise direction of the orifice plate 935) is substantially in a star form, which is generally constituted of 6 projected portions 832a each having a corner of an obtuse angle and 6 recessed portions 832b, each having a corner of an acute angle alternately arranged between these projected portions 832a. More specifically, 6 grooves are formed in the thickness-wise direction (liquid-ejecting direction) of the orifice plate shown in FIG. 18, where the recessed portion 832b, locally distant from the center O of the ejection opening, is set as the top thereof and the projected portion 832a, locally near from the center O of the ejection opening, is set as a base (see 1141a in FIG. 23 concerning the position of the groove).

Figure 20:
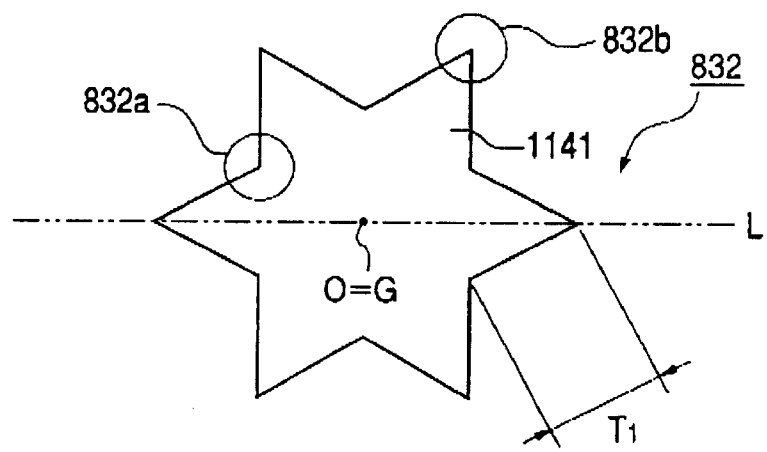
FIG. 20 is an enlarged view illustrating part of the ejection openings shown in FIG. 19.

In this embodiment, with the ejection opening part 940, for example, a section taken along a direction intersecting the thickness-wise direction thereof is in a form such that 2 equilateral triangles having sides of 27 $\mu$m are combined with each other in a state that one of them has been turned by 60 degrees. $T_1$ shown in FIG. 20 is 8 $\mu$m. The angles of the projected portions 832a are all 120 degrees, while the angles of the recessed portions 832b are all 60 degrees.

Accordingly, the center O of the ejection opening consists with the center of gravity of a polygon formed by connecting the centers (center (center of gravity) of a figure formed by connecting the top of the groove and two bases adjacent to the top) of the grooves adjacent to each other. The opening area of the ejection opening 832 in this embodiment is 400 $\mu m^2$, and the opening area (area of the figure formed by connecting the top of the groove and two bases adjacent to the top) of the groove is about 33 $\mu m^2$ per groove.

Figure 21:
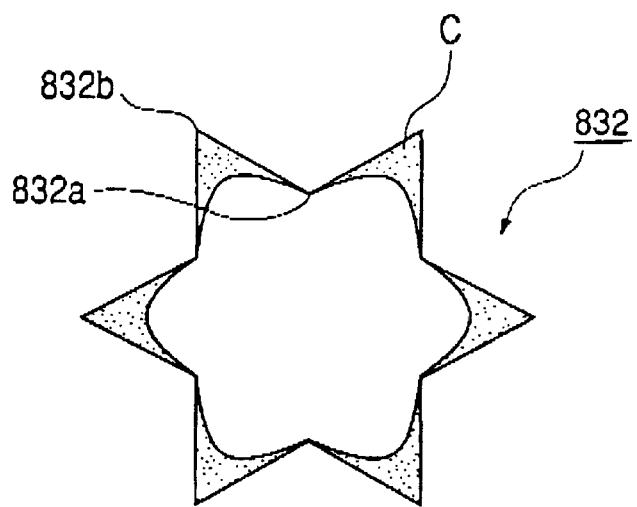
FIG. 21 schematically illustrates a state that an ink has attached to the ejection opening portion shown in FIG. 20.

FIG. 21 is a typical drawing illustrating a state that an ink has attached to the ejection opening portion shown in FIG. 20.

An ejecting operation of a liquid by the ink-jet recording head of the above-described construction will hereinafter be described with reference to FIGS. 23 to 30.

FIGS. 23 to 30 are cross-sectional views for illustrating the ejecting operation of a liquid by the liquid-ejecting head shown in FIGS. 18 to 22 and are cross-sectional views of the bubbling chamber 1337 shown in FIG. 22 taken along line X—X. In this section, an end of the ejection opening part 940 in the thickness-wise direction of the orifice plate is the top 1141a of a groove 1141.

Figure 23:
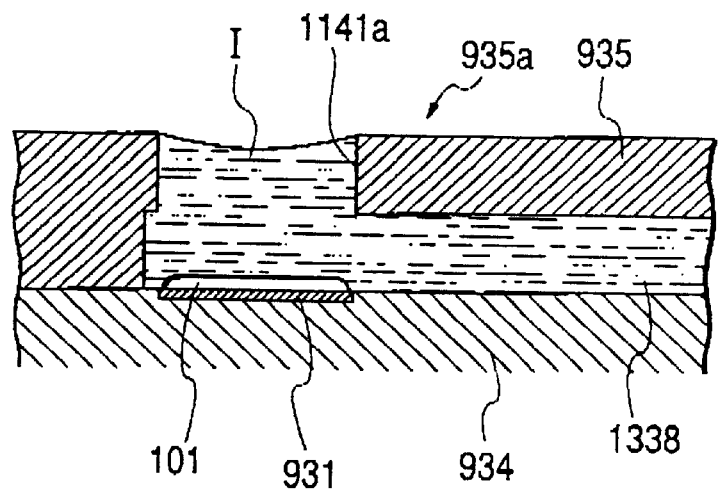
FIG. 23 is a schematic cross-sectional view corresponding to an X—X perspective sectional form in FIG. 22 and illustrating the liquid ejecting operation of the liquid-ejecting head with time together with FIGS. 24 to 30.

FIG. 23 illustrates a state that a film-like bubble has been formed on the heater, and FIGS. 24, 25, 26, 27, 28, 29 and 30 illustrate states after about 1 μs from the state in FIG. 23, after about 2 μs from the state in FIG. 23, after about 3 μs from the state in FIG. 23, after about 4 μs from the state in FIG. 23, after about 5 μs from the state in FIG. 23, after about 6 μs from the state in FIG. 23 and after about 7 μs from the state in FIG. 23, respectively. In the following description, "drop" or "drop-in" does not mean drop in the so-called gravity direction, but the movement in the direction of an electrothermal converter irrespective of the installing direction of a head.

Figure 24:
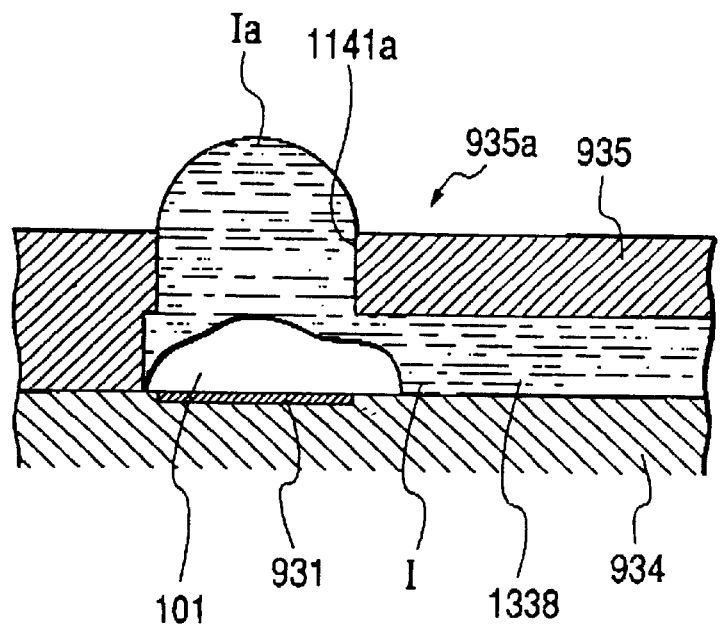
FIG. 24 is a schematic cross-sectional view corresponding to an X—X perspective sectional form in FIG. 22 and illustrating the liquid ejecting operation of the liquid-ejecting head with time together with FIGS. 23 and 25 to 30.
Figure 25:
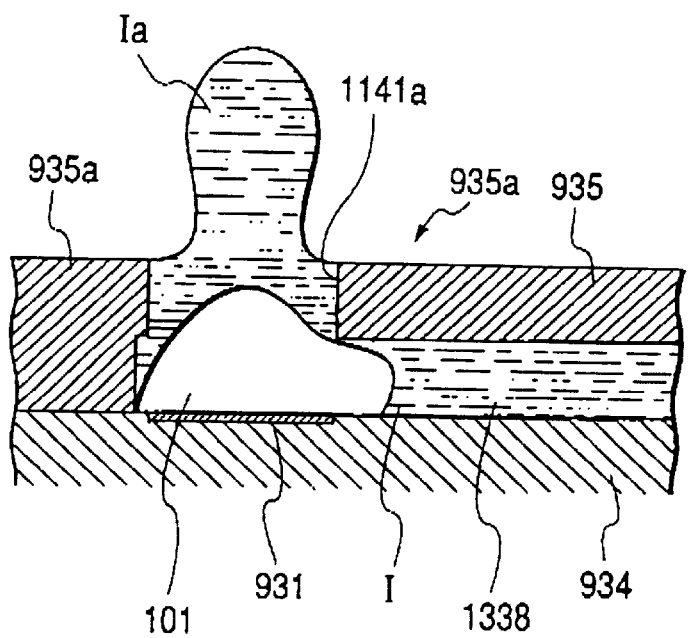
FIG. 25 is a schematic cross-sectional view corresponding to an X—X perspective sectional form in FIG. 22 and illustrating the liquid operation of the liquid-ejecting head with time together with FIGS. 23, 24 and 26 to 30.

When a bubble is first formed in a liquid flow path 1338 on a heater 931 by energizing the heater 931 on the basis of a recording signal or the like as illustrated in FIG. 23, the bubble quickly volumetrically expands and grows during about 2 μs as illustrated in FIGS. 24 and 25. The height of the bubble 101 with the greatest volume exceeds the ejection opening face 935a. At this time, the pressure of the bubble decreases to be from several fractions to ten and odd fractions of the atmospheric pressure.

Figure 26:
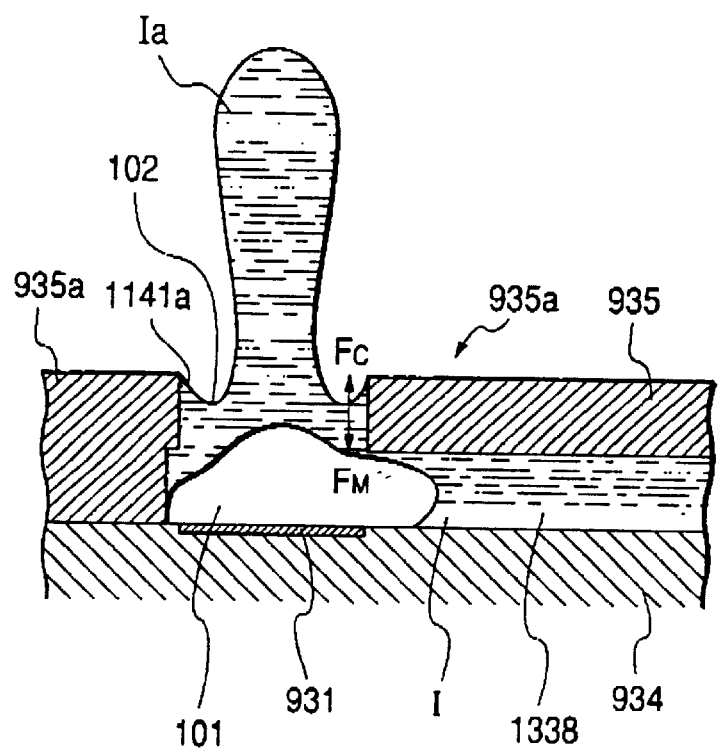
FIG. 26 is a schematic cross-sectional view corresponding to an X—X perspective sectional form in FIG. 22 in the liquid-ejecting head and illustrating the liquid ejecting operation of the liquid-ejecting head with time together with FIGS. 23 to 25 and 27 to 30.

At the time about 2 μs have elapsed from the formation of the bubble, the volume of the bubble 101 turns from the greatest volume to decreased volume as described above, and at substantially the same time as this, the formation of a meniscus 102 is started. The meniscus 102 also recedes, i.e., drops in the direction of the heater 931 as illustrated in FIG. 26.

In this embodiment, the ejection opening part has a plurality of grooves 1141 in a dispersed state, whereby a capillary force acts in an direction opposite to the receding direction $F_M$ of the meniscus at the portion of the groove 1141 when the meniscus 102 recedes. As a result, the forms of the meniscus and a main droplet (hereinafter also referred to as "liquid" or "ink") 1a at the time the meniscus recedes are compensated for so as to give substantially symmetrical forms to the center of the ejection opening even if some variation is observed in the state of the bubble 101 by some cause.

Figure 27:
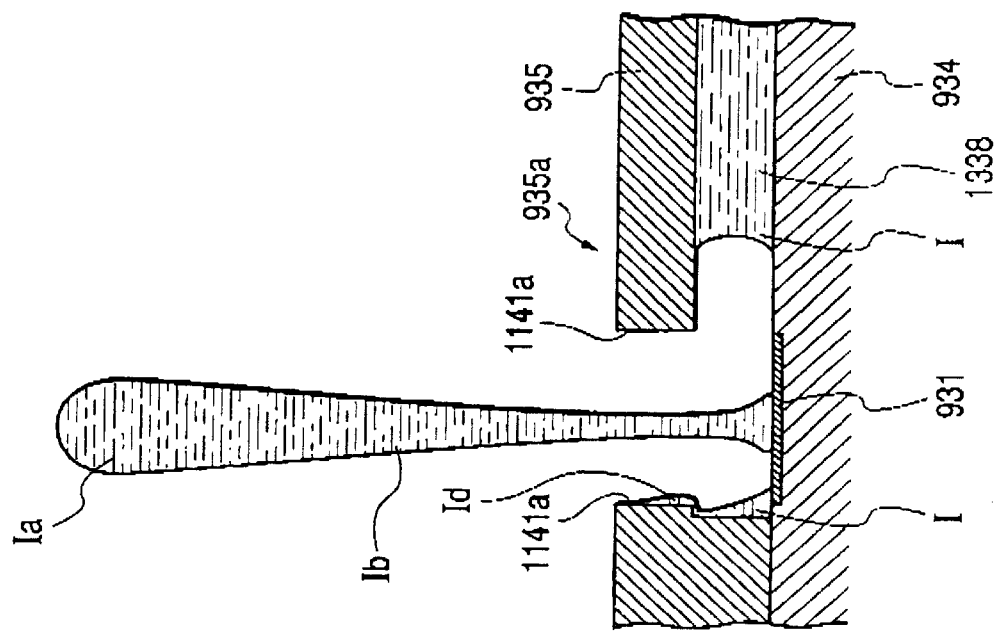
FIG. 27 is a schematic cross-sectional view corresponding to an X—X perspective sectional form in FIG. 22 and illustrating the liquid ejecting operation of the liquid-ejecting head with time together with FIGS. 23 to 26 and 28 to 30.

In this embodiment, the dropping velocity of this meniscus 102 is faster than the contracting velocity of the bubble 101, so that the bubble 101 communicates with the air in the vicinity of the lower surface of the ejection opening 832 at the time about 4 μs have elapsed from the formation of the bubble as illustrated in FIG. 27. At this time, the liquid (ink) in the vicinity of the central axis of the ejection opening 832 drops toward the heater 931, because the liquid (ink) 1a, pulled back on the side of the heater 931 by the negative pressure of the bubble 101 before the communication with the air, retains the velocity in the direction toward the heater 931 by virtue of inertia even after the communication with the air.

Figure 28:
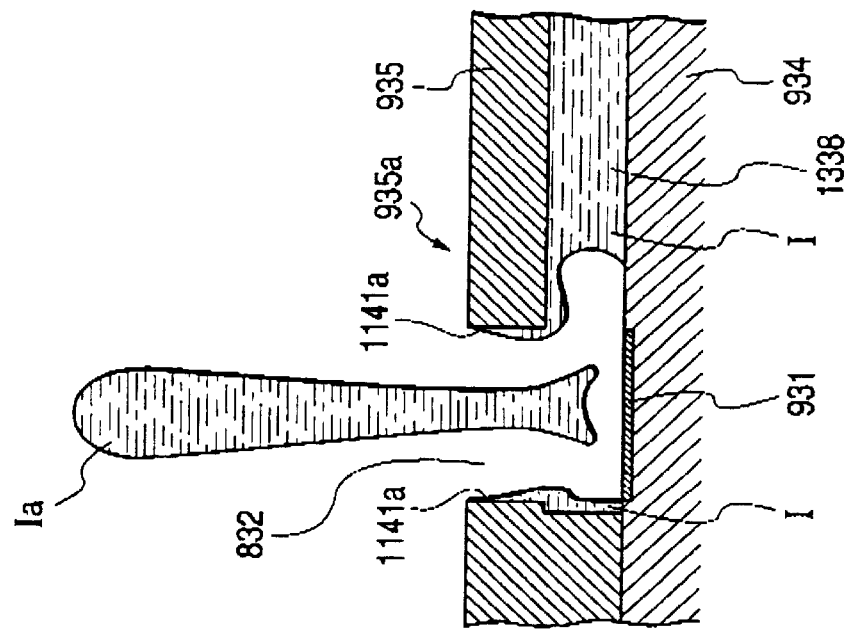
FIG. 28 is a schematic cross-sectional view corresponding to an X—X perspective sectional form in FIG. 22 and illustrating the liquid ejecting operation of the liquid-ejecting head with time together with FIGS. 23 to 27, 29 and 30.
Figure 29:
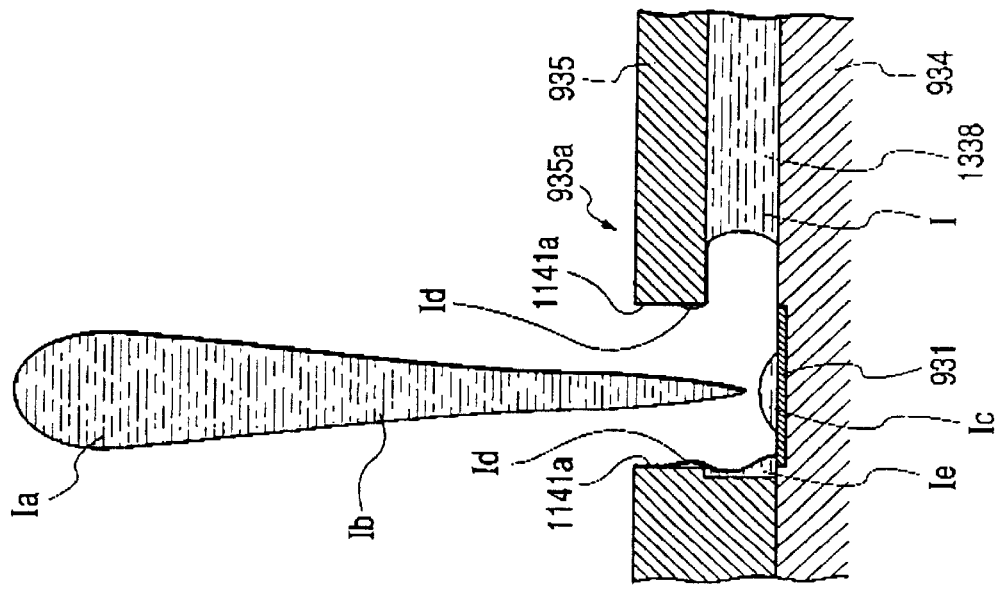
FIG. 29 is a schematic cross-sectional view corresponding to an X—X perspective sectional form in FIG. 22 and illustrating the liquid ejecting operation of the liquid-ejecting head with time together with FIGS. 23 to 28 and 30.

The liquid (ink) dropped toward the side of the heater 931 reaches the surface of the heater 931 at the time about 5 μs have elapsed from the formation of the bubble as illustrated in FIG. 28, and spreads so as to cover the surface of the heater 931 as illustrated in FIG. 29. The liquid spread so as to cover the surface of the heater 931 as described above has a vector in a horizontal direction along the surface of the heater 931. However, a vector in a direction intersecting the surface of the heater 931. for example, in a vertical direction vanishes, so that the liquid acts to remain on the surface of the heater 931, thereby pulling a liquid, located on the upper side than such a liquid, i.e., a liquid keeping a velocity vector in the ejecting direction, downward.

Figure 30:
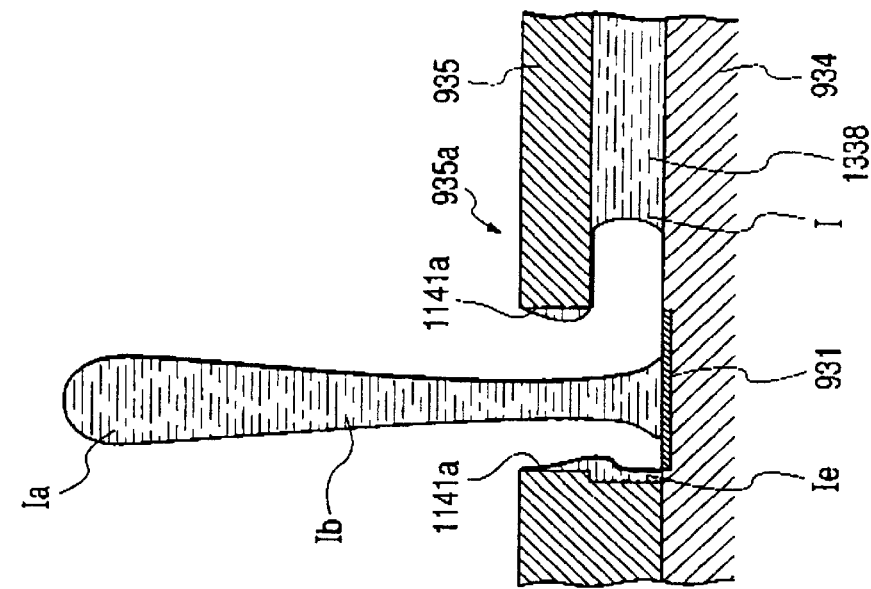
FIG. 30 is a schematic cross-sectional view corresponding to an X—X perspective sectional form in FIG. 22 and illustrating the liquid ejecting operation of the liquid-ejecting head with time together with FIGS. 23 to 29.

Thereafter, a liquid portion 1b between the liquid spread on the surface of the heater 931 and the liquid (main droplet) located on the upper side becomes thin, and is broken in the center of the surface of the heater 931 at the time about 7 μs have elapsed from the formation of the bubble as illustrated in FIG. 30, whereby the liquid is separated into the liquid 1a keeping a velocity vector in the ejecting direction and the liquid 1c spread on the surface of the heater 931. The position of such separation is desirably the interior of the liquid flow path 1338, and more preferably at a side closer to the electrothermal converter 931 than the ejection opening 832.

The main droplet 1a is ejected from the central portion of the ejection opening 832 without deviation in the ejecting direction and ejection slippage and lands at the prescribed position of a recording surface on a recording medium. The liquid 1c spread on the surface of the heater 931 is ejected as a satellite droplet following the main droplet up to now. However, it remains on the surface of the heater 931 without being ejected.

Since the ejection of the satellite droplet can be prevented as described above, splash, which is liable to occur due to the ejection of the satellite droplet, can be prevented, and the recording-receiving surface of the recording medium can be surely prevented from staining with mist suspending in the form of fog. In FIGS. 27 to 29, reference characters 1d and 1e indicate an ink (ink inside the groove) attaching to the groove portion and an ink remaining in the liquid flow path, respectively.

As described above, in the liquid-ejecting head according to this embodiment, the direction toward which the main droplet is ejected can be stabilized by a plurality of grooves dispersed around the center of the ejection opening when the liquid is ejected at the stage that the volume of the bubble decreases after growing into the greatest volume. As a result, a liquid-ejecting head free of slippage in the ejecting direction and high in landing accuracy can be provided. In addition, ejection can be stably conducted against the variation of bubbling at a high driving frequency, whereby high-speed and high-definition printing can be realized.

In particular, the liquid is ejected by communicating the bubble with the air for the first time at the stage that the volume of the bubble decreases, whereby mist caused by the ejection of the droplet under the communication of the bubble with the air can be prevented, so that the state that droplets attach to the ejection opening face, which forms a main cause of the so-called sudden ejection failure, can also be inhibited.

As another embodiment of the recording head of the ejection system in which a bubble is communicated with the air at the time of its ejection, the so-called edge shooter type is as described in, for example, Japanese Patent No. 2 783 647.

In particular, the present invention has excellent effects in the ink-jet recording systems, in particular, in recording heads and recording apparatus of an ink-jet system in which thermal energy is utilized to form a droplet to be ejected, thereby conducting recording.

With respect to the typical construction and principle thereof, those using the basic principle disclosed in, for example, U.S. Pat. Nos. 4,723,129 and 4,740,796 are preferred. This system may be applied to any of the so-called On-Demand type and the continuous type. In particular, the On-Demand type is effective because at least one driving signal which corresponds to recording information and gives a rapid temperature rise exceeding nuclear boiling is applied to an electrothermal converter arranged corresponding to a sheet or liquid path, in which a liquid (ink) is retained, thereby making the electrothermal convertor generate thermal energy to cause film boiling on the heat-acting surface of a recording head, so that a bubble can be formed in the liquid (ink) in response to the driving signal in a one to one relation. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent, in particular, in responsiveness can be achieved. It is therefore preferable to use such pulsed signals.

As the pulsed driving signal, such signals as described in U.S. Pat. Nos. 4,463,359 and 4,345,262, are suitable. When the conditions described in U.S. Pat. No. 4,313,124, that is an invention relating to the rate of temperature rise on the heat-acting surface, are adopted, very excellent recording can be conducted.

As the construction of the recording head, such combined constructions (linear liquid flow path or perpendicular liquid flow path) comprised of ejection openings, a liquid flow path and electrothermal converters as disclosed in the above-described publications, and besides, constructions based on U.S. Pat. Nos. 4,558,333 and 4,459,600, which disclose the construction in which a heat-acting portion is arranged in a curved region, may also be included in the present invention.

Constructions based on Japanese Patent Application Laid-Open No. 59-123670, which discloses the construction in which a slit common to a plurality of electrothermal converters is used as an ejection part of the electrothermal converters, and Japanese Patent Application Laid-Open No. 59-138461, which discloses the construction in which an opening absorbing pressure wave of thermal energy is provided opposite to an ejection part, may also be effective for the present invention.

Further, as a full-line type recording head having a length corresponding to the longest width of recording media, both of the construction in which the length is met by such a combination of plural recording heads as disclosed in the above-described publications and the construction in which one recording head is integrally formed may-be used, and the above-described effects of the present invention can be more effectively exhibited.

In addition, the present invention is effective even when using a replaceable, chip type recording head in which electrical connection to an apparatus body and the feed of an ink from the apparatus body is made feasible by installation in the apparatus body, or a cartridge type recording head in which an ink tank is provided integrally in a recording head itself.

Further, the addition of recovery means for a recording head, preliminary auxiliary means, etc. which are provided as the constitution of the recording apparatus according to the present invention is preferred because the effects of the present invention can be further stabilized. Specifically, capping means for the recording head, cleaning means, pressurizing or sucking means, preliminary heating means comprised of electrothermal converters, other heating elements or a combination thereof, and preliminary ejection mode conducting ejection separate from recording may also be effective for stable recording.

As a recording mode of the recording apparatus, the present invention is extremely effective for not only a recording mode using a main color such as black, but also an apparatus equipped with at least one of color composite of different colors and full color by color mixing, which may be created by an integrally constructed recording head or a combination of recording heads.

In the above-described embodiments of the present invention, the inks have been described as liquid. However, inks solidified at room temperature or lower may also be used so far as they are softened or liquid at a temperature higher than room temperature, or exhibit a liquid phase upon application of recording signals used because it is general in the above-described ink-jet systems that the temperature control of an ink itself is conducted within a range of from 30° C. to 70° C. to adjust the viscosity of the ink so as to fall within a stable ejection range.

In addition, the following inks may be used in the present invention: inks that are liquefied by applying thermal energy according to recording signals and ejected as liquid inks, such as inks whose temperature rise by thermal energy is positively prevented by using the thermal energy as energy for a phase change from a solid phase to a liquid phase and inks solidified in a state left standing for the purpose of preventing evaporation of the inks, and inks liquefied for the first time by thermal energy, such as those already beginning to solidify at the time they reach a recording medium. In such cases, the inks may be in a form such that they are opposed to electrothermal converters while retained as a liquid or solid in recesses or through-holes in a porous sheet as described in Japanese Patent Application Laid-Open No. 54-56847 or 60-71260. In the present invention, the above-described film boiling system is most effective for the above-described inks.

As forms of the recording apparatus according to the present invention, the following may be also adopted: forms that the apparatus is integrally or separately provided as an image output terminal for information processing instruments such as word processors and computers, and forms such as copying machines combined with a reader and facsimiles having a transmitting-receiving function.

The outline of a liquid-ejecting apparatus in which the above-described liquid-ejecting head is installed will hereinafter be described.

Figure 31:
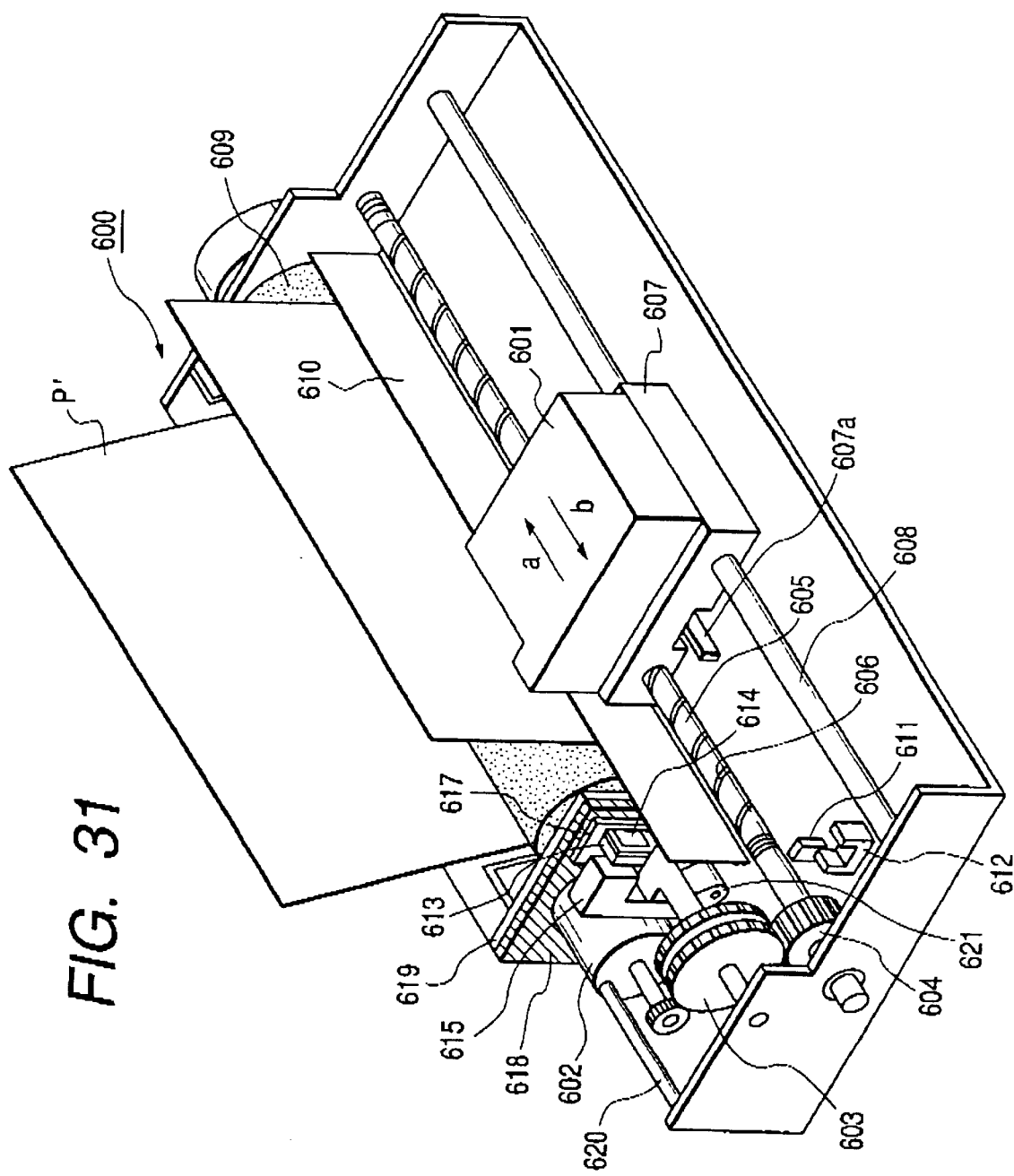

FIG. 31 is a schematic perspective view of an ink-jet recording apparatus 600, which is an example of a liquid-ejecting apparatus in which the liquid-ejecting head according to the present invention can be installed and to which the liquid-ejecting head of the present invention can be applied.

In FIG. 31, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 in a leadscrew 605 rotating through driving force-transmitting gears 603 and 604 interlocking with the forward and reverse rotations of a driving motor 602 and reciprocatively moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611, 612 are arranged In the vicinity of an end of the leadscrew 605. These are home position-detecting means for confirming the presence of a lever 607 a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck ink collected in the interior of the cap member 614 by empty ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by means of a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publically known means such as a clutch shift. An ink-jet recording control part for applying a signal to a heater provided in the liquid-ejecting head of the ink-jet head cartridge 601 and conducting drive control of the above-described respective mechanisms is provided on the side of the apparatus body, which is not illustrated in the drawings.

The ink-jet recording apparatus 600 having the above-described construction conducts recording on the recording medium P' conveyed on the platen roller 609 by the recording medium-conveying means (not illustrated) while reciprocatively moving the ink-jet head cartridge 601 over the full width of the recording medium P'.

As described above, according to the respective embodiments of the present invention, there can be provided ink sets which are free of fear for long-term storage stability in printing with a black ink by ink-jet recording, are capable of reducing the influence of recording media on print quality, can form images high in character quality and density and can effectively prevent the occurrence of bleeding from occurring when combined with color inks, and further ink-jet recording processes and ink-jet recording apparatus using such ink sets.

The present invention will hereinafter be described more specifically by the following Examples and Comparative Examples. However, the present invention is not limited to and by these examples so far as the subject matter of the present invention is not overstepped. The "parts" and "%" used in the following examples are by weight unless expressly noted.

Liquid Composition:

The following components were mixed and thoroughly stirred into a solution. The resultant solution was then filtered under pressure through a microfilter (product of Fuji Photo Film Co., Ltd.) having a pore size of 0.2 μm, thereby preparing a liquid composition.

| | |
|---|---|
| Sodium chloride | 10 parts |
| Trimethylolpropane | 6 parts |
| Glycerol | 5 parts |
| Diethylene glycol | 5 parts |
| Adduct of ethylene oxide with acetylene glycol (Acetylenol EH, trade name) | 0.15 parts |
| Water | 73.85 parts. |

Pigment Dispersion:

After 10 g of carbon black having a specific surface area of 220 m²/g and a DBP oil absorption of 112 ml/100 g and 0.55 g of p-amino-N-benzoic acid were thoroughly mixed with 72 g of water, 1.62 g of nitric acid were added dropwise to the mixture, followed by stirring at 70° C. After several minutes, a solution of 1.07 g of sodium nitrite in 5 g of water was further added to the mixture, and the resultant mixture was stirred for an additional 1 hour. The resultant slurry was filtered through filter paper (Toyo Filter Paper No. 2, trade name; product of Advantes Co.), and the resultant pigment particles were fully washed with water and dried in an oven at 90° C. Water was added to the dried pigment to prepare an aqueous dispersion of the pigment having a pigment concentration of 10%. The above-described process was carried out to introduce a group represented by the following chemical formula:

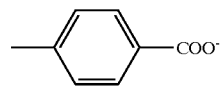

into the surface of the carbon black.

The above-prepared pigment dispersion was then used to prepare a black ink in accordance with the following process.

(Black Ink)

The following components were mixed and thoroughly stirred into a solution. The resultant solution was then filtered under pressure through a microfilter (product of Fuji Photo Film Co., Ltd.) having a pore size of 3.0 μm, thereby preparing a black ink.

| | |
|---|---|
| Pigment Dispersion described above | 30 parts |
| Trimethylolpropane | 6 parts |
| Glycerol | 5 parts |
| Diethylene glycol | 5 parts |
| Adduct of ethylene oxide with acetylene glycol (Acetylenol EH, trade name) | 0.15 parts |
| Water | 53.85 parts. |

EXAMPLE 1

The liquid composition and black ink prepared above were combined in the following manner to conduct printing. Using an ink-jet recording apparatus (BJC600, trade name, manufactured by Canon Inc.) having an On-Demand type multi-recording head which ejects ink by applying thermal energy to the ink in response to recording signals, the liquid composition was applied to a region, to which the black ink was to be applied, and a periphery thereof before the application of the black ink, thereby conducting printing. A time interval between the application of the liquid composition and the application of the black ink was determined to be about 30 msec.

EXAMPLE 2

The liquid composition and black ink prepared above were combined in the following manner to conduct printing. Using an ink-jet recording apparatus (BJC600, trade name, manufactured by Canon Inc.) having an On-Demand type multi-recording head which ejects an ink by applying thermal energy to the ink in response to recording signals, the liquid composition was applied to a region, to which the black ink had been applied, after the application of the black ink, thereby conducting printing. A time interval between the application of the liquid composition and the application of the black ink was determined to be about 30 msec.

COMPARATIVE EXAMPLE 1

Printing was conducted in the same manner as in EXAMPLE 1 except that the liquid composition in EXAMPLE 1 was not used.

With respect to EXAMPLES 1 and 2 and COMPARATIVE EXAMPLE 1, the following evaluation was conducted. The results thereof are shown in Table 1.

1) Image Density:

The above-prepared liquid composition and ink were used to conduct printing on the following plain paper A, B, C, D and E for copying by means of the above-described ink-jet recording apparatus. At this time, the image density was measured by a densitometer (manufactured by Macbeth Company), and evaluation was made in accordance with the following standard:

A: PPC PAPER NSK (trade name, product of Canon Inc.),

B: PPC PAPER NDK (trade name, product of Canon Inc.),

C: PPC PAPER 4024 (trade name, product of Xerox Co., Ltd.),

D: PPC PAPER PLOVER BOND (trade name, product of Fox River Co.)

E: CANON PPC PAPER (product of Noididora Co.).

(Hereafter, plain paper A, B, C, D and E for copying all correspond to these plain paper A, B, C, D and E for copying)

Evaluation Standard of Image Density:

a: A difference in image density among the plain paper A, B, C, D and E for copying was lower than 0.1 between the maximum and the minimum; and b: A difference in image density among the plain paper A, B, C, D and E for copying was not lower than 0.1 between the maximum and the minimum.

2) Character Quality:

The above-prepared liquid composition and Ink were used to conduct printing of characters on the plain paper A, B, C, D and E for copying, which are different in permeability of ink from one another, by means of the above-described ink-jet recording apparatus. At this time, the character quality was evaluated by whether blurs occurred or not in accordance with the following standard. In EXAMPLE 1, the liquid composition was applied to a region, to which the black ink was to be applied, before the application of the black ink, and in EXAMPLE 2, the liquid composition was applied to a region, to which the black ink had been applied, after the application of the black ink.

Evaluation Standard of Character Quality:

a: Blurs were little seen on the 5 kinds of paper;

b: Blurs were a little seen on some sheets of paper; and c: Blurs were seen on all the 5 kinds of paper.

3) Fixing Ability:

The above-prepared liquid composition and ink were used to conduct printing on the plain paper A, B, C, D and E for copying, which are different in permeability of ink from one another, by means of the above-described ink-jet recording apparatus. At this time, the printed area was rubbed with a hand to measure the time required until running of the printed area no longer occurred. Evaluation was then made in accordance with the following standard. In EXAMPLE 1, the liquid composition was applied to a region, to which the black ink was to be applied, before the application of the black ink, and in EXAMPLE 2, the liquid composition was applied to a region, to which the black ink had been applied, after the application of the black ink.

Evaluation Standard of Fixing Ability:

a: Running of the printed area scarcely occurred on all the 5 kinds of paper after 30 seconds;

b: Running of the printed area somewhat occurred on some sheets of paper after 30 seconds; and c: Running of the printed area somewhat occurred on some sheets of paper after 40 seconds.

TABLE 1

|  | Image density | Character quality | Fixing ability |
|---|---|---|---|
| Example 1 | a | a | b |
| Example 2 | a | b | a |
| Comparative Example 1 | b | b | c |

As apparent from the results shown in Table 1, the ink set according to an embodiment of the present invention can provide images high in character quality and optical density when printing was conducted by, for example, an ink-jet recording method.

EXAMPLE 3

(Liquid Composition)

A liquid composition was prepared in the same manner as the liquid composition in EXAMPLE 1.

(Black Ink)

A black ink was prepared in the same manner as the black ink in EXAMPLE 1.

Shelf Stability;

Two 100-ml glass containers (product of Shot Co.) were provided, and 100 ml each of the liquid composition and black ink prepared in EXAMPLE 3 were separately placed in these containers to observe whether a change of viscosity occurred or not in the ink or liquid composition before and after left standing. The evaluation standard is as follows. In this example, when a change of viscosity was great in any of the liquid composition and the black ink, the shelf stability was ranked as b. The result thereof is shown in Table 2.

Evaluation Standard of Shelf Stability:

a: A change of viscosity was scarcely observed in the ink and liquid composition before and after left standing;

b: A great change of viscosity was observed in the ink or liquid composition before and after left standing.

TABLE 2

|  | shelf stability |
|---|---|
| Example 3 | a |

EXAMPLE 4

(Liquid Composition)

A liquid composition was prepared in the same manner as the liquid composition in EXAMPLE 1.

(Black Ink)

A black ink was prepared in the same manner as the black ink in EXAMPLE 1.

(Yellow Ink 1)

The following components were mixed and thoroughly stirred into a solution. The resultant solution was then filtered under pressure through a microfilter (product of Fuji Photo Film Co., Ltd.) having a pore size of 0.2 µm, thereby preparing Yellow Ink 1.

| Adduct of ethylene oxide with acetylene glycol (Acetylenol EH, trade name) | 1 parts |
| --- | --- |
| Diethylene glycol | 10 parts |
| Glycerol | 5 parts |
| C.I. Direct Yellow 86 | 3 parts |
| Water | 81 parts. |

(Magenta Ink 1)

The following components were mixed and thoroughly stirred into a solution. The resultant solution was then filtered under pressure through a microfilter (product of Fuji Photo Film co., Ltd.) having a pore size of 0.2 μm, thereby preparing Magenta Ink 1.

| Adduct of ethylene oxide with acetylene glycol (Acetylenol EH, trade name) | 1 parts |
| --- | --- |
| Diethylene glycol | 10 parts |
| Glycerol | 5 parts |
| C.I. Acid Red 35 | 3 parts |
| Water | 81 parts. |

(Cyan Ink 1)

The following components were mixed and thoroughly stirred into a solution. The resultant solution was then filtered under pressure through a microfilter (product of Fuji Photo Film Co., Ltd.) having a pore size of 0.2 μm, thereby preparing Cyan Ink 1.

| Adduct of ethylene oxide with acetylene glycol (Acetylenol EH, trade name) | 1 parts |
| --- | --- |
| Diethylene glycol | 10 parts |
| Glycerol | 5 parts |
| C.I. Direct Blue 9 | 3 parts |
| Water | 81 parts. |

An ink set was prepared in accordance with the following combination:
Liquid composition,
Black ink,
Yellow Ink 1,
Magenta Ink 1 and
Cyan Ink 1.

COMPARATIVE EXAMPLE 2

(Black Ink)

A black ink prepared in the same manner as the black ink in EXAMPLE 1 was provided.

(Yellow Ink)

A yellow ink prepared in the same manner as the yellow ink in EXAMPLE 4 was provided.

(Magenta Ink)

A magenta ink prepared in the same manner as the magenta ink in EXAMPLE 4 was provided.

(Cyan Ink)

A cyan ink prepared in the same manner as the cyan ink in EXAMPLE 4 was provided.

An ink set was prepared in accordance with the following combination:
Black ink,
Yellow ink,
Magenta ink and
Cyan ink.

Each of the ink sets obtained in EXAMPLE 4 and COMPARATIVE EXAMPLE 2 was used to make evaluation as to bleeding in the following manner by means of an ink-jet recording apparatus, BJF-800 (trade name, manufactured by Canon Inc.) having an On-Demand type multi-recording head which ejects ink by applying thermal energy to the ink in response to recording signals. The results thereof are shown in Table 3.

(Evaluation of Bleeding)

A square area of 10 cm in each side on each of the plain papers was divided into 5×5 squares, each being of 2 cm×2 cm, and solid black images and solid color images were alternately printed thereon with the black ink and each of the color inks. Using the images thus printed, any bleeding at the boundaries between the areas printed with the black ink and the areas printed with each of the color inks was examined, making an evaluation in accordance with the following standard. In EXAMPLE 4, the liquid composition was solidly applied to a region, to which the black ink was to be applied, before the application of the black ink.

Evaluation Standard of Bleeding:

a: Boundary lines between the two colors were distinct, and neither blurs nor mixed colors were observed at the boundary;

b: Boundary lines between the two colors were clearly present, but some blurs or mixed colors were observed at the boundary in some paper, c: Boundary lines between the two colors were not distinguishable.

TABLE 3

|  | Bleeding |
| --- | --- |
| Example 4 | a |
| Comparative Example 2 | c |

What is claimed is:

1. An aqueous liquid composition used in the formation of an ink-jet image together with an ink containing a self-dispersing pigment dispersed in an aqueous medium, wherein said liquid composition comprises at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group.

2. The liquid composition according to claim 1, wherein the salt is contained in an amount that is sufficient to break the dispersion stability of the self-dispersing pigment in the ink when the liquid composition is brought into contact with the ink on a recording medium.

3. The liquid composition according to claim 2, wherein the amount is in the range of from 1 to 20% by weight based on the total weight of the liquid composition.

4. The liquid composition according to claim 1, wherein the liquid composition is ejected by an ink-jet method.

5. An ink set which comprises, in combination, an ink containing an aqueous medium and a self-dispersing pigment dispersed in the aqueous medium, and the liquid composition according to claim 1.

6. The ink set according to claim 5, wherein the self-dispersing pigment is self-dispersing carbon black.

7. The ink set according to claim 5, wherein the self-dispersing pigment is a self-dispersing organic pigment.

8. The ink set according to claim 5, wherein the ink is an ink developing one hue selected from the group consisting of yellow, magenta, cyan, red, green, blue and black.

9. The ink set according to claim 5, wherein the ink is a combination of at least two inks different in hue from each other.

10. The ink set according to claim 9, wherein said at least two inks different in hue from each other are at least two selected from the group consisting of inks respectively developing colors of yellow, magenta, cyan, red, green, blue and black.

11. The ink set according to claim 5, which further comprises, In combination, a second ink containing an aqueous medium and a dye.

12. The ink set according to claim 11, wherein the second ink is at least one selected from the group consisting of inks respectively developing colors of yellow, magenta, cyan, red, green, blue and black.

13. A recording process which comprises the steps:
   (i) applying an ink containing an aqueous medium and a self-dispersing pigment dispersed in the aqueous medium to a recording medium; and
   (ii) applying an aqueous liquid composition comprising at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group, to at least a region on the recording medium, to which the ink is applied.

14. The recording process according to claim 13, wherein step (i) is conducted by means of an ink-jet apparatus.

15. The recording process according to claim 13, wherein step (ii) is conducted by means of an ink-jet apparatus.

16. The recording process according to claim 13, wherein after step (ii) is conducted, step (i) is conducted.

17. The recording process according to claim 13, wherein step (ii), step (i) and step (ii) are conducted in that order.

18. A process for forming on a recording medium a multi-color image including regions which are different in hue from each other, and have a portion at which they are adjacent to each other, the process comprising the steps of:
   applying a plurality of inks different in hue from each other to the recording medium to form the multi-color image, wherein at least one of the inks contains a self-dispersing pigment dispersed in an aqueous medium; and
   applying the liquid composition according to claim 1 to at least a region on the recording medium, to which the ink containing the self-dispersing pigment is applied.

19. A recording unit which comprises a liquid composition holding portion holding the liquid composition according to claim 1, an ink-jet head from which the liquid composition is ejected, an ink container portion holding an ink containing an aqueous medium and a self-dispersing pigment dispersed in the aqueous medium, and an ink-jet head from which the ink is ejected.

20. An ink-jet apparatus which comprises a liquid composition holding portion for holding the liquid composition according to claim 1, an ink container portion holding an ink containing an aqueous medium and a self-dispersing pigment dispersed in the aqueous medium, and ink-jet heads from which the liquid composition held in the liquid composition holding portion and the ink held in the ink container portion are ejected independently of each other.

21. A process for facilitating the fixing of an ink containing an aqueous medium and a self-dispersing pigment dispersed in the aqueous medium to a recording medium when the ink is applied to the recording medium by using an ink-jet apparatus, the process comprising applying a liquid composition containing at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group, to at least an area on the recording medium, where the ink is applied.

22. A process for improving multi-color image quality on a recording medium, said multi-color image containing at least a first region and a second region which are different in hue from each other and adjacent to each other at least at a part thereof, the process comprising the steps of:
   forming the first region by a process comprising a step of applying a first ink having a first hue to the recording medium and a step of applying a liquid composition to at least an area on the recording medium, where the first ink is applied; and
   forming the second region by a process comprising a step of applying a second ink having a second hue to the recording medium,
   wherein the first ink contains an aqueous medium and a self-dispersing pigment dispersed in the aqueous medium, and the liquid composition contains at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group.

23. The process according to claim 22 for improving multi-color image quality, wherein the second region is formed by a process comprising a step of applying the second ink to the recording medium and a step of applying the liquid composition to at least an area on the recording medium, where the second ink is applied, the second ink contains an aqueous medium and a self-dispersing pigment dispersed in the aqueous medium, and the liquid composition contains at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group.

24. A process for recovering inkjet heads for ejecting an ink and an aqueous liquid composition, the ink comprising a self-dispersing pigment dispersed in an aqueous medium, and the liquid composition comprising at least one salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$, wherein M1 denotes an alkali metal or ammonium, and Ph denotes a phenyl group, comprising a step of recovering the respective ink jet heads, wherein the recovering step is performed with a common recovery system.

25. An ink-jet recording apparatus according to claim 20, further comprising a common recovery system for recovering the ink jet heads.

* * * * *

UNITED STATES PATENT AND TRADEMARK OFFICE
CERTIFICATE OF CORRECTION

PATENT NO.   : 6,506,239 B1
DATED        : January 14, 2003
INVENTOR(S)  : Koichi Osumi et al.

It is certified that error appears in the above-identified patent and that said Letters Patent is hereby corrected as shown below:

Title page,
Item [56], References Cited, FOREIGN PATENT DOCUMENTS, "11105415 A" should read -- 11-105415 A --.

Column 1,
Line 31, "continues" should read -- continuous --.
Line 33, "61-283875" should read -- 63-152681 --.

Column 2,
Line 40, "high-a-quality" should read -- high-quality --.
Line 62, "intention," should read -- invention --.

Column 3,
Line 6, "Ink" should read -- ink --.

Column 4,
Line 4, "$(M1)_2SO_2$" should read -- $(M1)_2 SO_3$ --.

Column 8,
Line 59, "5160," should read -- S160, --.

Column 9,
Line 18, "Fyranthrone" should read -- Pyranthrone --.
Line 22, "ianthraquinonyl" should read -- Dianthraquinonyl --.
Line 37, "above-describe" should read -- above-described --.

Column 12,
Line 5, "becoming a problem in an" should read -- that is a problem in a --.

Column 13,
Line 27, "occur" should read -- occurs --.
Line 47, "medium" should read -- medium 25 --.

UNITED STATES PATENT AND TRADEMARK OFFICE
CERTIFICATE OF CORRECTION

PATENT NO.    : 6,506,239 B1
DATED         : January 14, 2003
INVENTOR(S)   : Koichi Osumi et al.

It is certified that error appears in the above-identified patent and that said Letters Patent is hereby corrected as shown below:

Column 14,
Line 5, "and" should read -- and the --.
Line 6, "occur, and" should read -- occurring, with the result that --.

Column 16,
Line 11, "movement" should read -- movement. --.
Line 41, "Is" should read -- is --.
Line 58, "and be" should read -- can be --.
Line 66, "portion-containing" should read -- portion containing --.

Column 17,
Line 3, "In" should read -- in --.

Column 21,
Line 31, "an" should read -- a --.
Line 61, "931." should read -- 931, --.

Column 24,
Line 58, "In" should read -- in --.

Column 27,
Line 31, "Ink" should read -- ink --.

Column 29,
Lines 3, 18 and 33, "1 parts" should read -- 1 part --.

Column 31,
Line 10, "In" should read -- in --.

Signed and Sealed this

Thirtieth Day of December, 2003

JAMES E. ROGAN
*Director of the United States Patent and Trademark Office*